US012371881B2

(12) United States Patent
Igarashi et al.

(10) Patent No.: US 12,371,881 B2
(45) Date of Patent: Jul. 29, 2025

(54) WORK MACHINE

(71) Applicant: Hitachi Construction Machinery Co., Ltd., Tokyo (JP)

(72) Inventors: Teruki Igarashi, Tsuchiura (JP); Hiroaki Tanaka, Tsuchiura (JP); Ryohei Fukuchi, Tsuchiura (JP); Yusuke Suzuki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/688,848

(22) PCT Filed: Mar. 30, 2023

(86) PCT No.: PCT/JP2023/013434
§ 371 (c)(1),
(2) Date: Mar. 4, 2024

(87) PCT Pub. No.: WO2023/191014
PCT Pub. Date: Oct. 5, 2023

(65) Prior Publication Data

US 2024/0376691 A1 Nov. 14, 2024

(30) Foreign Application Priority Data

Mar. 31, 2022 (JP) ................................. 2022-060233

(51) Int. Cl.
*E02F 9/22* (2006.01)
*F15B 11/042* (2006.01)
*F15B 11/044* (2006.01)

(52) U.S. Cl.
CPC .......... *E02F 9/2292* (2013.01); *F15B 11/042* (2013.01); *F15B 11/0426* (2013.01);
(Continued)

(58) Field of Classification Search
CPC ..... E02F 9/2221; E02F 9/2235; E02F 9/2285; E02F 9/2292; E02F 9/2296; F15B 11/042; F15B 11/0426; F15B 11/044
See application file for complete search history.

(56) References Cited

U.S. PATENT DOCUMENTS

2006/0095163 A1 5/2006 Wear et al.
2010/0228439 A1* 9/2010 Nakamura .............. B62D 5/09 701/41
(Continued)

FOREIGN PATENT DOCUMENTS

JP 11-350536 A 12/1999
JP 2010-71414 A 4/2010
(Continued)

OTHER PUBLICATIONS

International Preliminary Report on Patentability (PCT/IB/338 & PCT/IB/373) issued in PCT Application No. PCT/JP2023/013434 dated Oct. 10, 2024, including English translation of Written Opinion (PCT/ISA/237) (5 pages).
(Continued)

*Primary Examiner* — Matthew Wiblin
(74) *Attorney, Agent, or Firm* — Crowell & Moring LLP

(57) ABSTRACT

A work machine includes a flow control valve that controls the flow rate of a hydraulic operating fluid supplied from a hydraulic pump to a hydraulic cylinder, a solenoid valve that generates an operation pressure for operating the flow control valve, and a controller. The controller executes learning processing of changing in a stepwise manner the operation pressure generated by the solenoid valve, sensing the pressure of the hydraulic cylinder, and storing the operation pressure when the pressure of the hydraulic cylinder has become a reference value, as a learning result operation pressure. The controller calculates a differential pressure across the flow control valve and computes a target opening
(Continued)

area of the flow control valve on the basis of the differential pressure across the flow control valve and a target flow rate of the hydraulic operating fluid that passes through the flow control valve. The controller computes a target value of the operation pressure generated by the solenoid valve, on the basis of an opening characteristic table, the target opening area, and the learning result operation pressure, and controls the solenoid valve on the basis of the target value of the operation pressure.

9 Claims, 21 Drawing Sheets

(52) U.S. Cl.
CPC .......... *F15B 11/044* (2013.01); *E02F 9/2221* (2013.01); *E02F 9/2235* (2013.01); *E02F 9/2285* (2013.01); *E02F 9/2296* (2013.01)

(56) References Cited

U.S. PATENT DOCUMENTS

2011/0168011 A1 7/2011 Takei et al.
2013/0213026 A1* 8/2013 Yamamoto ............ F04B 49/002 60/327
2019/0316611 A1* 10/2019 Kondo .................. E02F 9/2217
2019/0338494 A1* 11/2019 Moriki .................. E02F 9/2029
2021/0207345 A1* 7/2021 Kobayashi ............ F15B 11/028
2021/0262196 A1* 8/2021 Ito .......................... E02F 9/205
2022/0220709 A1 7/2022 Kamon et al.

FOREIGN PATENT DOCUMENTS

WO WO 2018/087831 A1 5/2018
WO WO 2020/241419 A1 12/2020

OTHER PUBLICATIONS

International Search Report (PCT/ISA/210) issued in PCT Application No. PCT/JP2023/013434 dated Jun. 6, 2023 with English translation (4 pages).
Japanese-language Written Opinion (PCT/ISA/237) issued in PCT Application No. PCT/JP2023/013434 dated Jun. 6, 2023 with English translation (5 pages).

* cited by examiner

WORK MACHINE

TECHNICAL FIELD

The present invention relates to a work machine.

BACKGROUND ART

In recent years, demands for semi-automatic operation, automatic operation, remote operation, and so forth have been increasing with regard to work machines such as hydraulic excavators, and advancement toward electronic control of the work machines has been made. As a technique that allows the electronic control of the work machine, there is a technique in which hydraulic actuators are controlled with use of solenoid valves. For example, a method in which control valves for controlling hydraulic actuators such as hydraulic cylinders and hydraulic motors are operated by a pilot pressure (operation pressure) generated by a solenoid valve has been known.

Here, a technique in which, in electronic control of a work machine, the individual difference of the work machine is considered and data used for control is calibrated to improve the excavation accuracy has been known (refer to Patent Document 1).

In Patent Document 1, an invention intended to improve the excavation accuracy in semi-automatic operation is disclosed. A work machine described in Patent Document 1 includes a controller that stores data that defines the relation between a pilot pressure and the operating velocity of a cylinder. The controller repeats processing of temporarily lowering the current value of a current output to a solenoid valve (solenoid proportional control valve) and thereafter outputting a current with a current value larger than that before the lowering to the solenoid valve, to thereby raise in a stepwise manner the current value of the current output to the solenoid valve. The controller calibrates the relation between the pilot pressure and the operating velocity of the cylinder in the above-described data on the basis of the operating velocity of the cylinder when the current value has risen in the stepwise manner.

PRIOR ART DOCUMENT

Patent Document

Patent Document 1: PCT Patent Publication No. WO2018/087831

SUMMARY OF THE INVENTION

Problem to be Solved by the Invention

However, in the case of employing an open center system as the hydraulic system applied to the work machine, the operating velocity of the cylinder with respect to the current value of the current output to the solenoid valve changes depending on the hydraulic load. Therefore, even when the operating velocity of the hydraulic cylinder in a specific hydraulic load condition (for example, in-air operation) is learned, there is a possibility that the operating velocity of the hydraulic cylinder deviates from the operating velocity at the time of the learning in an actual hydraulic load condition (for example, excavation or pressing of a ground surface). In this case, improvement in the excavation accuracy cannot be expected.

The present invention intends to provide a work machine capable of performing work with high accuracy with suppression of variation in operation of a hydraulic cylinder attributable to the individual difference of the work machine, irrespective of the configuration of a hydraulic system.

Means for Solving the Problem

A work machine according to one aspect of the present invention includes a hydraulic pump that delivers a hydraulic operating fluid, a hydraulic cylinder driven by the hydraulic operating fluid delivered from the hydraulic pump, a driving target member driven by the hydraulic cylinder, a flow control valve that controls the flow rate of the hydraulic operating fluid supplied from the hydraulic pump to the hydraulic cylinder, a solenoid valve that generates an operation pressure for operating the flow control valve, a controller that controls the solenoid valve, and a pressure sensor that senses a pressure of the hydraulic cylinder. An opening characteristic table that defines a relation between the operation pressure and the opening area of the flow control valve is stored in the controller. The controller is configured to execute learning processing of changing in a stepwise manner the operation pressure generated by the solenoid valve and storing the operation pressure when the pressure of the hydraulic cylinder sensed by the pressure sensor or the time change rate of the pressure of the hydraulic cylinder has become a reference value set in advance. The controller is configured to calculate the differential pressure across the flow control valve and compute a target opening area of the flow control valve on the basis of the calculated differential pressure across the flow control valve and a target flow rate of the hydraulic operating fluid that passes through the flow control valve. The controller is configured to compute a target value of the operation pressure generated by the solenoid valve, on the basis of the opening characteristic table, the target opening area computed, and a learning result operation pressure that is the operation pressure stored in the learning processing, and control the solenoid valve on the basis of the computed target value of the operation pressure.

Advantages of the Invention

According to the present invention, it is possible to provide a work machine capable of performing work with high accuracy with suppression of variation in operation of a hydraulic cylinder attributable to the individual difference of the work machine, irrespective of the configuration of a hydraulic system.

BRIEF DESCRIPTION OF THE DRAWINGS

FIG. 13 is a diagram explaining a correction method of an opening characteristic table To.

MODES FOR CARRYING OUT THE INVENTION

Work machines according to embodiments of the present invention will be described with reference to the drawings.

First Embodiment

—Hydraulic Excavator—

Figure 1:
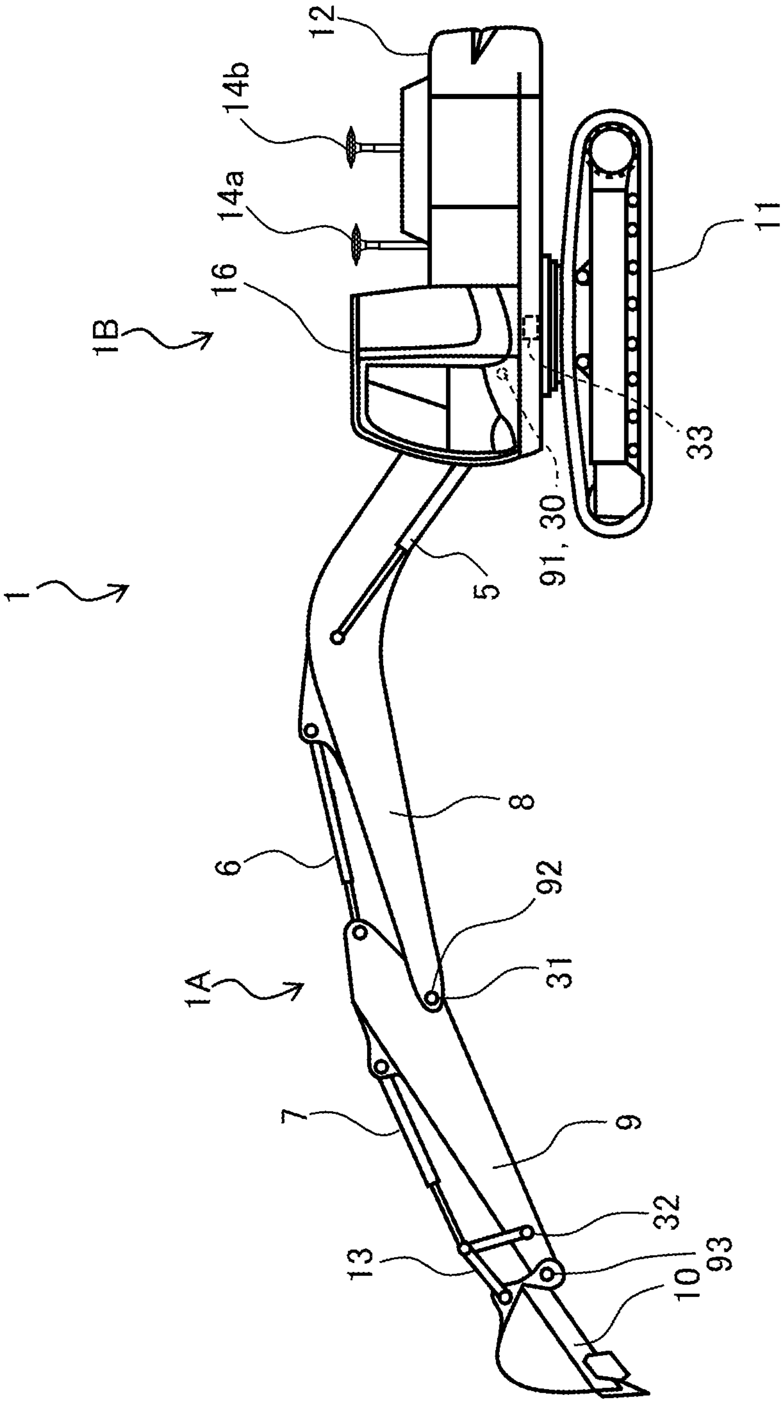
FIG. 1 is a side view of a hydraulic excavator illustrated as one example of a work machine.

FIG. 1 is a side view of a hydraulic excavator illustrated as one example of a work machine according to a first embodiment of the present invention. In the present embodiment, description will be made by taking, as an example, a hydraulic excavator in which a bucket 10 is mounted on the tip of a work device as an attachment (work equipment). However, the present invention can be applied also to a hydraulic excavator in which an attachment other than the bucket is mounted.

As illustrated in FIG. 1, a hydraulic excavator 1 includes a machine body 1B and an articulated work device (front work implement) 1A attached to the machine body 1B. The machine body 1B has a track structure 11 that travels by left and right travelling motors (hydraulic motors) and a swing structure 12 attached onto the track structure 11. The swing structure 12 swings relative to the track structure 11 by a swing motor (hydraulic motor). The swing center axis of the swing structure 12 is vertical in the state in which the hydraulic excavator 1 is stopped on the horizontal ground. A cab 16 is provided in the swing structure 12.

The work device 1A has a configuration in which a plurality of driving target members (boom 8, arm 9, and bucket 10) that each pivot in a vertical surface are joined. The base end of the boom 8 is pivotally joined to a front part of the swing structure 12 with the interposition of a boom pin 91. The arm 9 is pivotally joined to the tip of this boom 8 with the interposition of an arm pin 92, and the bucket 10 is pivotally joined to the tip of the arm 9 with the interposition of a bucket pin 93. The boom 8 is driven by a boom cylinder 5 that is a hydraulic cylinder. The arm 9 is driven by an arm cylinder 6 that is a hydraulic cylinder. The bucket 10 is driven by a bucket cylinder 7 that is a hydraulic cylinder. The hydraulic cylinders 5, 6, and 7 include a bottomed cylindrical cylinder tube having one closed end, a head cover that closes the opening at the other end of the cylinder tube, a cylinder rod that penetrates the head cover and is inserted into the cylinder tube, and a piston that is disposed at the tip of the cylinder rod and segments the inside of the cylinder tube into a rod chamber and a bottom chamber.

A boom angle sensor 30 is attached to the boom pin 91. An arm angle sensor 31 is attached to the arm pin 92. A bucket angle sensor 32 is attached to a bucket link 13. A machine body inclination angle sensor 33 is attached to the swing structure 12. The angle sensors 30, 31, and 32 sense pivot angles $\alpha$, $\beta$, and $\gamma$ (FIG. 3) of the boom 8, the arm 9, and the bucket 10, respectively, and output a signal representing the sensing result to a controller 40 (described later). The machine body inclination angle sensor 33 senses a machine body inclination angle $\theta$ (FIG. 3) of the swing structure 12 (machine body 1B) with respect to a reference plane (for example, horizontal plane) and outputs a signal representing the sensing result to the controller 40 (described later).

The swing structure 12 is equipped with a pair of antennas for GNSS (Global Navigation Satellite System: global satellite positioning system) (hereinafter, referred to as GNSS antennas) 14*a* and 14*b*. The controller 40 calculates the position and the orientation of the swing structure 12 in the global coordinate system on the basis of satellite signals (GNSS radio waves) from a plurality of positioning satellites received by the GNSS antennas 14*a* and 14*b*.

—Hydraulic System—

Figure 2:
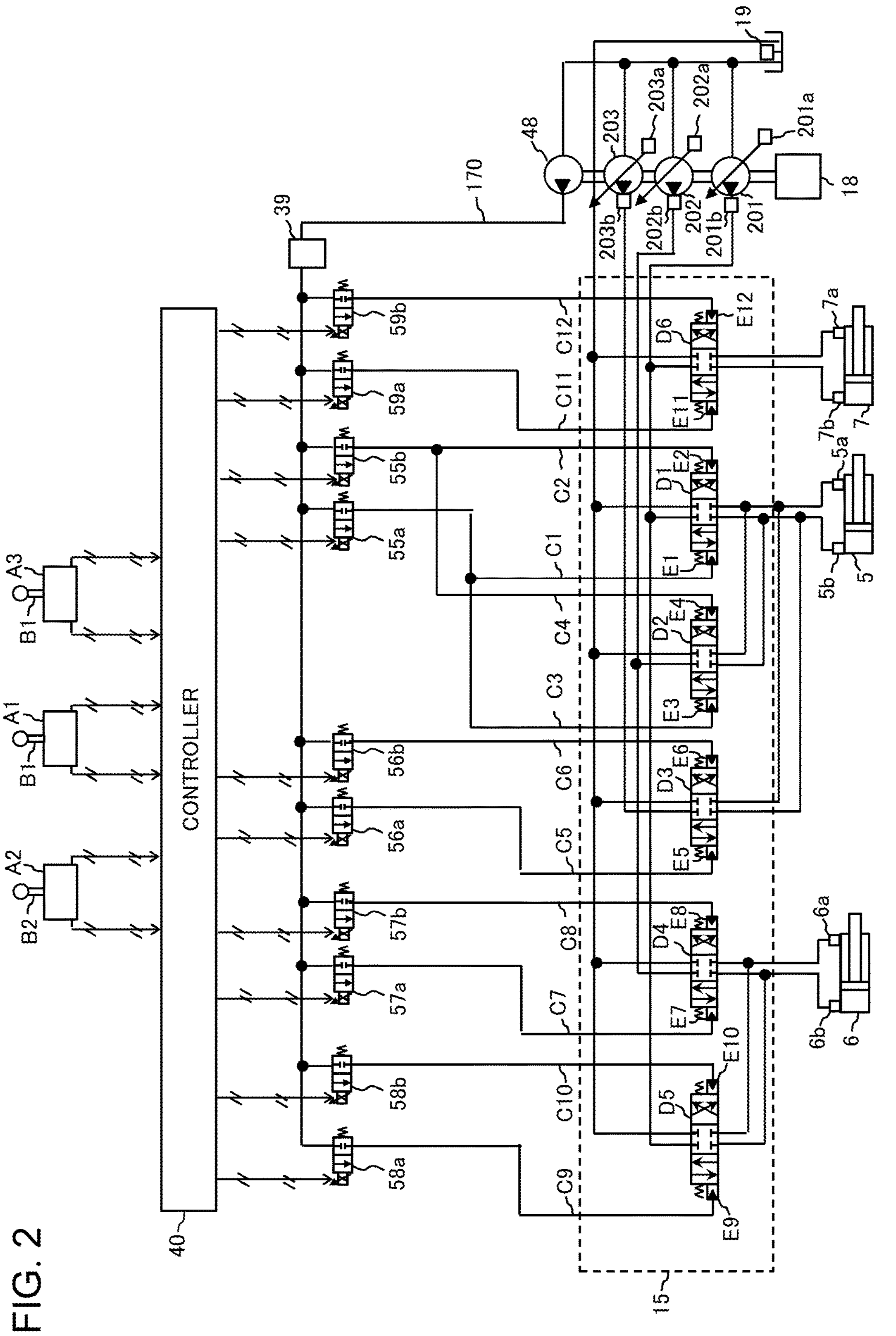
FIG. 2 is a diagram illustrating a configuration of a hydraulic system mounted in the hydraulic excavator.

FIG. 2 is a diagram illustrating the configuration of a hydraulic system mounted in the hydraulic excavator 1. In FIG. 2, a hydraulic circuit relating to the boom cylinder 5, the arm cylinder 6, and the bucket cylinder 7 is illustrated and illustration is omitted with respect to a hydraulic circuit relating to the travelling motors and the swing motor.

Electrical operation lever devices A1 to A3 are installed in the cab 16. The electrical operation lever devices A1 and A3 share an operation lever B1 disposed on one side of the left and right of an operation seat (not illustrated). When the electrical operation lever device A1 is operated by the operation lever B1, the controller 40 actuates solenoid valves 55*a*, 55*b*, 56*a*, and 56*b*. As a result, the boom cylinder 5 (boom 8) is driven. When the electrical operation lever device A3 is operated by the operation lever B1, the controller 40 actuates solenoid valves 59*a* and 59*b*. As a result, the bucket cylinder 7 (bucket 10) is driven. The electrical operation lever device A2 has an operation lever B2 disposed on the other side of the left and right of the operation seat. When the electrical operation lever device A2 is operated by the operation lever B2, the controller 40 actuates solenoid valves 57*a*, 57*b*, 58*a*, and 58*b*. As a result, the arm cylinder 6 (arm 9) is driven.

To the inlet side and the outlet side of each of the boom cylinder 5, the arm cylinder 6, and the bucket cylinder 7, pressure sensors 5*a*, 5*b*, 6*a*, 6*b*, 7*a*, and 7*b* that sense the inlet side pressure and the outlet side pressure of these hydraulic cylinders 5, 6, and 7 are attached. The pressure sensor 5*a* senses the pressure of a hydraulic operating fluid of the rod chamber of the boom cylinder 5, and the pressure sensor 5*b* senses the pressure of the hydraulic operating fluid of the bottom chamber of the boom cylinder 5. The pressure sensor 6*a* senses the pressure of the hydraulic operating fluid of the rod chamber of the arm cylinder 6, and the pressure sensor 6*b* senses the pressure of the hydraulic operating fluid of the bottom chamber of the arm cylinder 6. The pressure sensor 7*a* senses the pressure of the hydraulic operating fluid of the rod chamber of the bucket cylinder 7, and the pressure sensor 7*b* senses the pressure of the hydraulic operating fluid of the bottom chamber of the bucket cylinder 7.

Pressure sensors 201*b*, 202*b*, and 203*b* that sense the delivery pressure of main pumps 201, 202, and 203 are attached to the delivery ports of the main pumps 201, 202, and 203. A temperature sensor 19 that senses the temperature of the hydraulic operating fluid is attached to a tank.

In the swing structure 12, an engine 18 that is a prime mover, the first main pump 201, the second main pump 202, the third main pump 203, and a pilot pump 48 are mounted. The first main pump 201, the second main pump 202, the third main pump 203, and the pilot pump 48 are driven by the engine 18 and deliver the hydraulic operating fluid sucked from the tank. The main pumps 201, 202, and 203 are variable displacement hydraulic pumps for which the delivery capacity (displacement volume) per one revolution is controlled by a regulator 201*a*, 202*a*, or 203*a*. The main pumps 201, 202, and 203 are, for example, hydraulic pumps of a swash plate type in which the delivery capacity is controlled by the tilting angle of a swash plate. The main pumps 201, 202, and 203 deliver a hydraulic fluid that drives a plurality of hydraulic actuators (boom cylinder 5, arm cylinder 6, bucket cylinder 7, and so forth). The pilot pump 48 is a fixed displacement hydraulic pump in which the delivery capacity per one revolution is constant.

The regulators 201*a*, 202*a*, and 203*a* are respectively driven by a hydraulic signal corresponding to a target value (hereinafter, referred to also as a target regulator pressure) PPc201, PPc202, or PPc203 of a regulator pressure computed by the controller 40 on the basis of the operation amount of the electrical operation lever devices A1 to A3 and respectively control the delivery capacity of the hydraulic pump 201, 202, and 203.

Specifically, the regulators 201*a*, 202*a*, and 203*a* each include a regulator solenoid valve (not illustrated). The controller 40 outputs an electrical signal (excitation current) corresponding to the target regulator pressure to the regulator solenoid valve. As a result, the regulator solenoid valve is driven, and the regulator pressure that operates the swash plate is generated by the regulator solenoid valve. The regulator solenoid valve is a solenoid proportional pressure reducing valve that generates the regulator pressure (pilot secondary pressure) corresponding to a command from the controller 40, by reducing the delivery pressure (pilot primary pressure) of the pilot pump 48.

The tilting angle of the swash plate (that is, delivery capacity) changes depending on the regulator pressure generated by the regulator solenoid valve. This changes the delivery flow rate of the main pump 201, 202, or 203. Hence, the delivery flow rate of the main pumps 201, 202, and 203 changes according to the target regulator pressure computed by the controller 40.

The hydraulic system has the plurality of solenoid valves 55*a* to 59*b*. The plurality of solenoid valves 55*a* to 59*b* generate an operation pressure that operates respective flow control valves D1 to D6 to be described later, according to a command (electrical signal) from the controller 40. The plurality of solenoid valves 55*a* to 59*b* are solenoid proportional pressure reducing valves that generate the operation pressure (pilot secondary pressure) corresponding to the operation direction and the operation amount of the electrical operation lever device A1 to A3, by reducing the delivery pressure (pilot primary pressure) of the pilot pump 48.

A lock valve 39 is disposed on a delivery line 170 of the pilot pump 48. The downstream side of the lock valve 39 in the delivery line 170 is made to branch into a plurality of lines to be connected to the solenoid valves 55*a* to 59*b*. The lock valve 39 of the present embodiment is a solenoid selector valve, and a solenoid thereof is electrically connected to a position sensor of a gate lock lever (not illustrated) disposed in the cab 16 of the swing structure 12. The position of the gate lock lever is sensed by the position sensor, and a signal corresponding to the position of the gate lock lever is input from the position sensor to the lock valve 39. When the position of the gate lock lever is at a lock position, the lock valve 39 is closed, and the delivery line 170 is interrupted, so that supply of the pilot pressure from the pilot pump 48 to the solenoid valves 55*a* to 59*b* is interrupted. When the position of the gate lock lever is at a lock release position, the lock valve 39 opens, and the delivery line 170 opens, so that the pilot pressure is supplied from the pilot pump 48 to the solenoid valves 55*a* to 59*b*. In the state in which the delivery line 170 is interrupted, operation by the electrical operation lever devices A1 to A3 is disabled, and operation of excavation or the like is prohibited.

The controller 40 generates an electrical signal (excitation current) that drives the respective solenoid valves 55*a* to 59*b* according to the operation amount and the operation direction of the operation lever B1 or B2 of the respective electrical operation lever devices A1 to A3 and outputs the electrical signal to the respective solenoid valves 55*a* to 59*b* corresponding to the operation direction of the operation lever B1 or B2. The hydraulic system includes a control valve unit 15 that controls the flow of the hydraulic operating fluid that is delivered from the main pumps 201, 202, and 203 and is supplied to the hydraulic cylinders 5 to 7. The control valve unit 15 includes the plurality of flow control valves D1 to D6.

The flow control valve D1 controls the flow rate of the hydraulic operating fluid supplied from the first main pump 201 to the boom cylinder 5, in response to operation of the electrical operation lever device A1. The operation pressure generated by the solenoid valve 55*a* or 55*b* driven by a command of the controller 40 is input to a pressure receiving chamber E1 or E2 of the flow control valve D1 through a pilot line C1 or C2. A spool of the flow control valve D1 is driven according to the operation pressure input to the pressure receiving chamber E1 or E2. Through the driving of the spool of the flow control valve D1, the supply direction and the flow rate of the hydraulic fluid from the first main pump 201 to the boom cylinder 5 are controlled, and the boom cylinder 5 is driven.

The flow control valve D2 controls the flow rate of the hydraulic operating fluid supplied from the second main pump 202 to the boom cylinder 5, in response to operation of the electrical operation lever device A1. The operation pressure generated by the solenoid valve 55*a* or 55*b* driven by a command of the controller 40 is input to a pressure receiving chamber E3 or E4 of the flow control valve D2 through a pilot line C3 or C4. A spool of the flow control valve D2 is driven according to the operation pressure input to the pressure receiving chamber E3 or E4. Through the driving of the spool of the flow control valve D2, the supply direction and the flow rate of the hydraulic fluid from the second main pump 202 to the boom cylinder 5 are controlled, and the boom cylinder 5 is driven.

The flow control valve D3 controls the flow rate of the hydraulic operating fluid supplied from the third main pump 203 to the boom cylinder 5, in response to operation of the electrical operation lever device A1. The operation pressure generated by the solenoid valve 56*a* or 56*b* driven by a command of the controller 40 is input to a pressure receiving chamber E5 or E6 of the flow control valve D3 through a pilot line C5 or C6. A spool of the flow control valve D3 is driven according to the operation pressure input to the pressure receiving chamber E5 or E6. Through the driving of the spool of the flow control valve D3, the supply direction and the flow rate of the hydraulic fluid from the third main pump 203 to the boom cylinder 5 are controlled, and the boom cylinder 5 is driven.

In this manner, the boom cylinder 5 is driven through the control of the flow rate of the hydraulic operating fluid delivered from the three main pumps 201, 202, and 203 by the three flow control valves D1, D2, and D3. When the controller 40 gives a command only to the solenoid valve 56*a* or 56*b* in the solenoid valves 55*a*, 55*b*, 56*a*, and 56*b*, the boom cylinder 5 is driven only by the hydraulic operating fluid delivered from the third main pump 203.

The flow control valve D4 controls the flow rate of the hydraulic operating fluid supplied from the second main pump 202 to the arm cylinder 6, in response to operation of the electrical operation lever device A2. The operation pressure generated by the solenoid valve 57*a* or 57*b* driven by a command of the controller 40 is input to a pressure receiving chamber E7 or E8 of the flow control valve D4 through a pilot line C7 and C8. A spool of the flow control valve D4 is driven according to the operation pressure input to the pressure receiving chamber E7 or E8. Through the driving of the spool of the flow control valve D4, the supply direction and the flow rate of the hydraulic fluid from the second main pump 202 to the arm cylinder 6 are controlled, and the arm cylinder 6 is driven.

The flow control valve D5 controls the flow rate of the hydraulic operating fluid supplied from the first main pump 201 to the arm cylinder 6, in response to operation of the electrical operation lever device A2. The operation pressure generated by the solenoid valve 58*a* or 58*b* driven by a command of the controller 40 is input to a pressure receiving chamber E9 or E10 of the flow control valve D5 through a pilot line C9 or C10. A spool of the flow control valve D5 is driven according to the operation pressure input to the pressure receiving chamber E9 or E10. Through the driving of the spool of the flow control valve D5, the supply direction and the flow rate of the hydraulic fluid from the first main pump 201 to the arm cylinder 6 are controlled, and the arm cylinder 6 is driven.

In this manner, the arm cylinder 6 is driven through the control of the flow rate of the hydraulic operating fluid supplied from the two main pumps 201 and 202 by the two flow control valves D4 and D5. When the controller 40 gives a command only to the solenoid valve 57*a* or 57*b* in the solenoid valves 57*a*, 57*b*, 58*a*, and 58*b*, the arm cylinder 6 is driven only by the hydraulic operating fluid delivered from the second main pump 202.

The flow control valve D6 controls the flow rate of the hydraulic operating fluid supplied from the first main pump 201 to the bucket cylinder 7, in response to operation of the electrical operation lever device A3. The operation pressure generated by the solenoid valve 59*a* or 59*b* driven by a command of the controller 40 is input to a pressure receiving chamber E11 or E12 of the flow control valve D6 through a pilot line C11 or C12. A spool of the flow control valve D6 is driven according to the operation pressure input to the pressure receiving chamber E11 or E12. Through the driving of the spool of the flow control valve D6, the supply direction and the flow rate of the hydraulic fluid from the first main pump 201 to the bucket cylinder 7 are controlled, and the bucket cylinder 7 is driven. In this manner, the bucket cylinder 7 is driven through the control of the flow rate of the hydraulic operating fluid delivered from the first main pump 201 by the flow control valve D6.

—Computation Method of Bucket Tip Position (Control Point of Work Device)—

Figure 3:
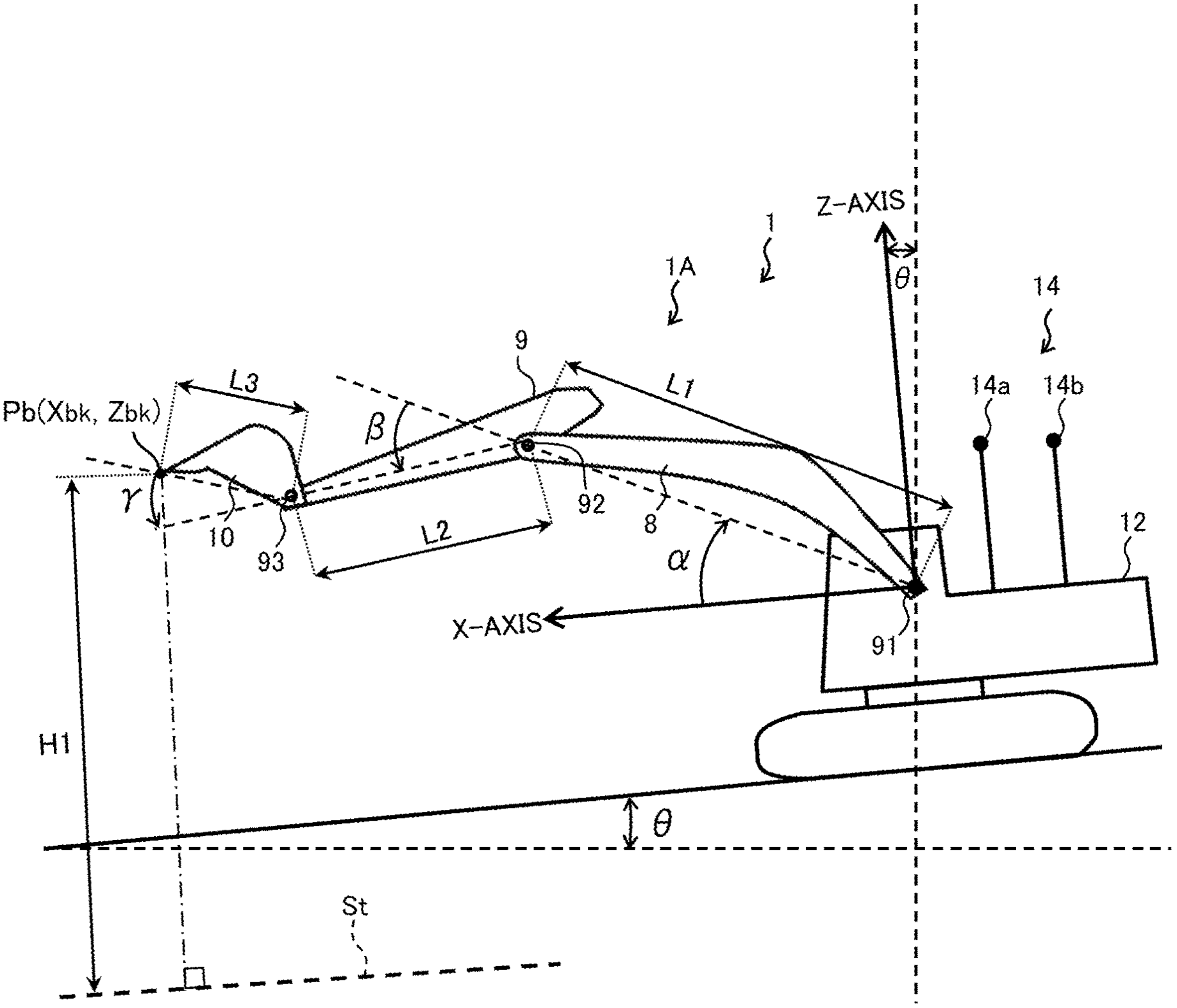
FIG. 3 is an explanatory diagram of a computation method of a bucket tip position.

FIG. 3 is an explanatory diagram of a computation method of the bucket tip position. The posture of the work device 1A can be defined on the basis of an excavator-based coordinate system illustrated in FIG. 3. The excavator-based coordinate system in FIG. 3 is a coordinate system set on the basis of the swing structure 12. In the excavator-based coordinate system, the origin is set at the center axis of the boom pin 91, while a Z-axis is set in parallel to the swing center axis of the swing structure 12 (in a direction toward a position immediately above the swing structure 12), and an X-axis is set in a direction orthogonal to the Z-axis (toward the front side of the swing structure 12). Hereinafter, the inclination angle of the boom 8 with respect to the X-axis will be referred to as the boom angle $\alpha$, the inclination angle of the arm 9 with respect to the boom 8 will be referred to as the arm angle $\beta$, and the inclination angle of the bucket 10 with respect to the arm 9 will be referred to as the bucket angle $\gamma$. Furthermore, the inclination angle of the machine body 1B (swing structure 12) with respect to a horizontal plane (reference plane), that is, the angle formed by the horizontal plane (reference plane) and the X-axis, will be referred to as the machine body inclination angle $\theta$.

The boom angle $\alpha$ is sensed by the boom angle sensor 30. The arm angle $\beta$ is sensed by the arm angle sensor 31. The bucket angle $\gamma$ is sensed by the bucket angle sensor 32. The machine body inclination angle $\theta$ is sensed by the machine body inclination angle sensor 33. The boom angle $\alpha$ becomes the minimum in the state in which the boom 8 is raised to the upper limit (boom cylinder 5 is in the most-extended state), and becomes the maximum in the state in which the boom 8 is lowered to the lower limit (boom cylinder 5 is in the most-contracted state). The arm angle $\beta$ becomes the minimum when the arm cylinder 6 is in the most-contracted state, and becomes the maximum when the arm cylinder 6 is in the most-extended state. The bucket angle $\gamma$ becomes the minimum when the bucket cylinder 7 is in the most-contracted state (state in FIG. 3), and becomes the maximum when the bucket cylinder 7 is in the most-extended state.

The position of a tip part (hereinafter, referred to as a tip position Pb) of the bucket 10 in the excavator-based coordinate system is represented by the following (expression 1) and (expression 2), with Xbk being the position in the X-direction and with Zbk being the position in the Z-direction.

$$Xbk = L1\cos(\alpha) + L2\cos(\alpha+\beta) + L3\cos(\alpha+\beta+\gamma) \quad \text{(expression 1)}$$

$$Zbk = L1\sin(\alpha) + L2\sin(\alpha+\beta) + L3\sin(\alpha+\beta+\gamma) \quad \text{(expression 2)}$$

Here, L1 is the length from the center axis of the boom pin 91 that joins the swing structure 12 and the boom 8 to the center axis of the arm pin 92 that joins the boom 8 and the arm 9. L2 is the length from the center axis of the arm pin 92 to the center axis of the bucket pin 93 that joins the arm 9 and the bucket 10. L3 is the length from the center axis of the bucket pin 93 to the tip position (for example, claw tip of the bucket 10) Pb of the bucket 10.

—Control System of Hydraulic Excavator—

Figure 4:
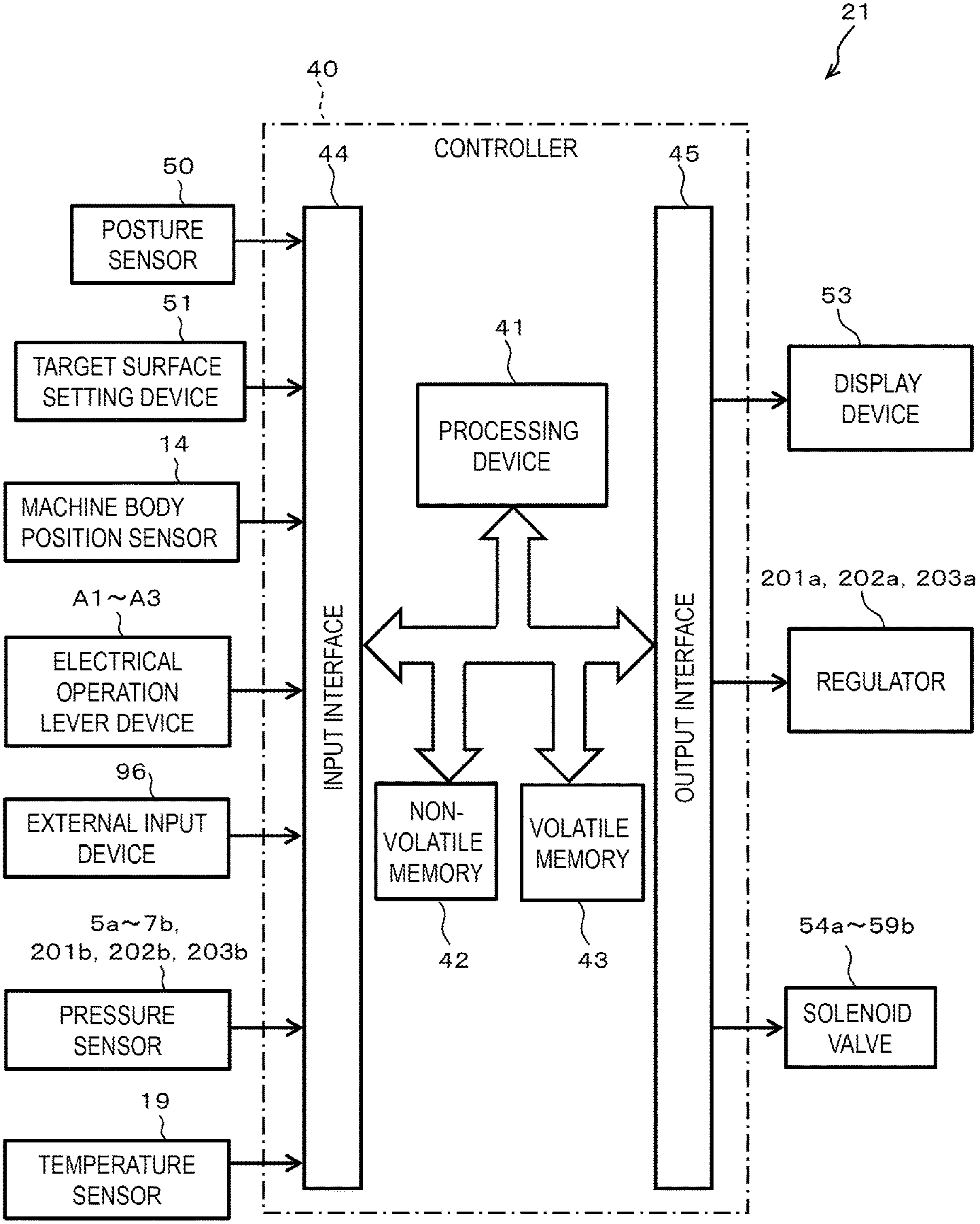
FIG. 4 is a hardware configuration diagram of a control system of the hydraulic excavator.

With reference to FIG. 4, a control system 21 that executes machine control (MC) and machine guidance (MG) will be described. FIG. 4 is a hardware configuration diagram of the control system 21 of the hydraulic excavator 1.

The controller 40 has an MC function of intervening in operation performed by an operator, under a certain condition, and limiting operation of the work device 1A when at least one of the electrical operation lever devices A1 to A3 is operated. Included in the MC are "area limiting control" executed when arm operation by the electrical operation lever device A2 or boom operation by the electrical operation lever device A1 is executed and "stop control" executed when boom lowering operation by the electrical operation lever device A1 or bucket operation by the electrical operation lever device A3 is executed.

The area limiting control is referred to also as "ground leveling control." While the area limiting control is executed, at least one of the boom cylinder 5, the arm cylinder 6, and the bucket cylinder 7 is controlled to prevent the work device 1A from excavating an area on the lower side relative to an excavation target surface St (see FIG. 3). In the area limiting control, operation of the work device 1A is controlled to cause the tip part of the bucket 10 to move along the excavation target surface St by arm operation or boom operation. For example, when arm operation is executed, the controller 40 makes a command of boom raising or boom lowering such that the velocity vector of the tip part of the bucket 10 in the direction perpendicular to the excavation target surface St becomes zero. Further, when boom operation is executed, the controller 40 makes a command of arm pulling or arm pushing such that the velocity vector of the tip part of the bucket 10 in the direction perpendicular to the excavation target surface St becomes zero. As a result, the locus of the tip part of the bucket 10 based on arm operation or boom operation that is pivot motion is corrected to a straight line trajectory extending along the excavation target surface St.

The stop control is control to stop boom lowering operation or bucket operation to prevent the tip part of the bucket 10 from entering an area on the lower side relative to the excavation target surface St. In the stop control, the controller 40 decelerates boom lowering operation or bucket operation as the tip part of the bucket 10 comes closer to the excavation target surface St.

In the present embodiment, the control point of the work device 1A at the time of MC is set to the claw tip of the bucket 10 of the hydraulic excavator 1. However, the control point can be changed to a point other than the claw tip of the bucket 10 as long as it is a point on a tip part of the work device 1A. For example, the control point may be set on the bottom surface of the bucket 10 or the outermost part of the bucket link 13. Moreover, the point on the bucket 10 at the shortest distance from the excavation target surface St may be set as the control point. That is, the control point may change according to the situation.

In the MC, there are "automatic control" in which operation of the work device 1A is controlled by the controller 40 when the electrical operation lever devices A1 to A3 are not operated and "semi-automatic control" in which operation of the work device 1A is controlled by the controller 40 only when any of the electrical operation lever devices A1 to A3 is operated. The MC is referred to also as "intervention control" as control by the controller 40 intervenes in operation by the operator.

Figure 5:
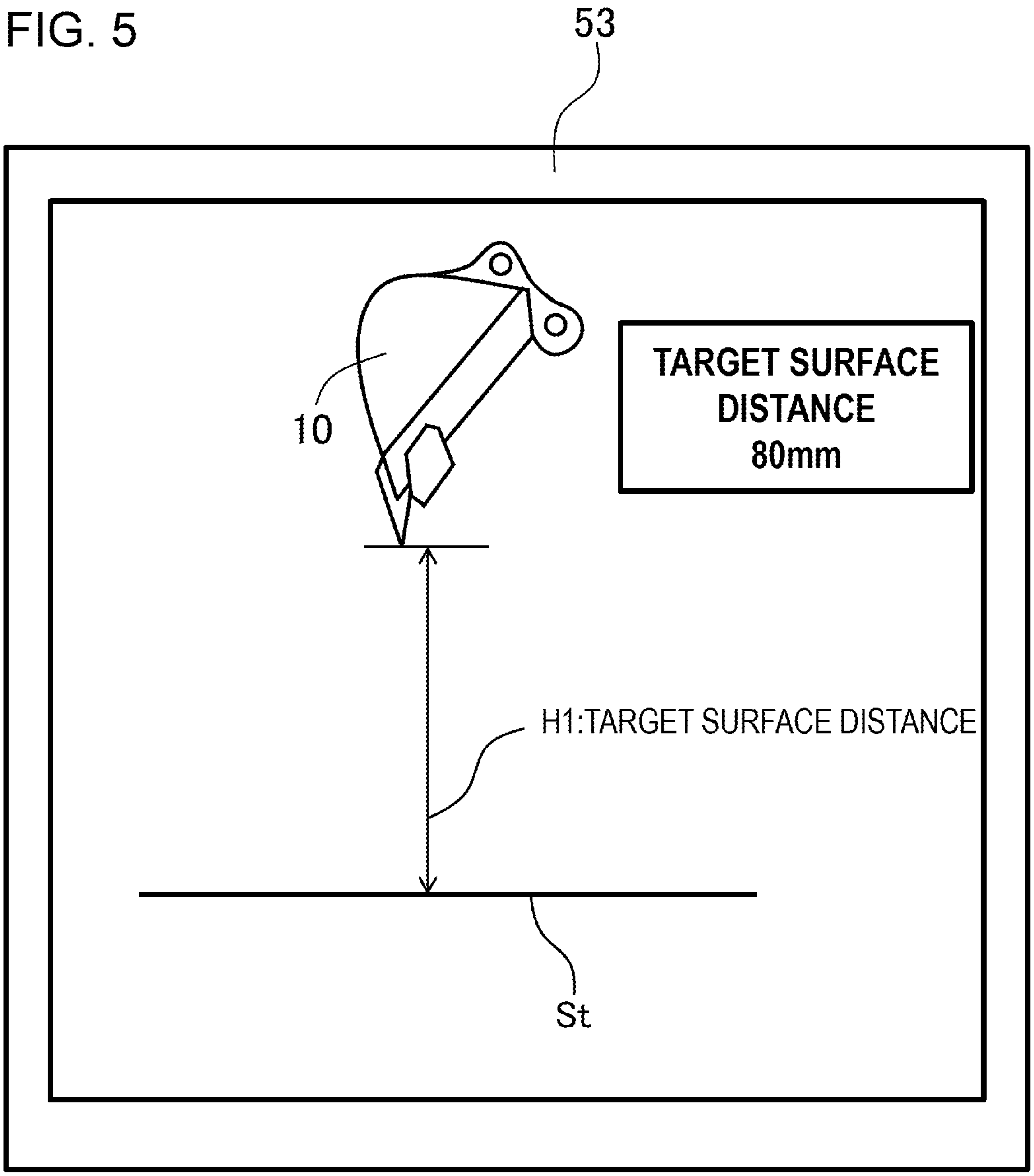
FIG. 5 is a diagram illustrating one example of a display screen of a display device.

Further, as the MG, for example, the control system 21 executes processing of displaying the positional relation between the excavation target surface St and the work device 1A (for example, bucket 10) on a display device 53 as illustrated in FIG. 5.

As illustrated in FIG. 4, the control system 21 has the controller 40, a posture sensor 50 that is connected to the controller 40 and outputs a signal to the controller 40, a target surface setting device 51, a machine body position sensor 14, the electrical operation lever devices A1 to A3, an external input device 96, the pressure sensors 5*a* to 7*b*, and the temperature sensor 19. Moreover, the control system 21 has the display device 53 that is connected to the controller 40 and is controlled on the basis of a signal from the controller 40, the regulators 201*a*, 202*a*, and 203*a*, and the solenoid valves 55*a* to 59*b*.

The posture sensor 50 has the boom angle sensor 30, the arm angle sensor 31, the bucket angle sensor 32, and the machine body inclination angle sensor 33. These angle sensors 30, 31, 32, and 33 acquire information relating to the posture of the hydraulic excavator 1 and output a signal according to the information. That is, the angle sensors 30, 31, 32, and 33 function as posture sensors that sense the posture of the work device 1A, that is, the posture of the plurality of driving target members (boom 8, arm 9, and bucket 10) that configure the work device 1A. As the angle sensors 30, 31, and 32, for example, potentiometers that acquire the boom angle $\alpha$, the arm angle $\beta$, and the bucket angle $\gamma$ as the information relating to the posture and output a signal (voltage) according to the acquired angle can be employed. Further, it is possible to employ, as the machine body inclination angle sensor 33, an IMU (Inertial Measurement Unit: inertial measuring device) that acquires the angular velocity and the acceleration of orthogonal three axes as information relating to the posture of the swing structure 12 and computes the machine body inclination angle $\theta$ on the basis of this information to output a signal representing the machine body inclination angle $\theta$ to the controller 40.

The controller 40 may execute the computation of the machine body inclination angle $\theta$ on the basis of the output signal of the IMU. Moreover, it is also possible to replace each of the angle sensors 30 to 32 by a sensor (IMU or the like) that senses the inclination angle with respect to a reference plane or a sensor that senses the stroke of any of the hydraulic cylinders 5 to 7.

The target surface setting device 51 is a device that can input, to the controller 40, information relating to an excavation target surface, such as position information concerning the excavation target surface and information on the inclination angle of the excavation target surface with respect to a reference plane (horizontal plane). For example, the target surface setting device 51 is connected to an external terminal (not illustrated) that stores three-dimensional data of an excavation target surface defined in the global coordinate system (absolute coordinate system), and the three-dimensional data of the excavation target surface is input from the external terminal to the target surface setting device 51. The operator may manually input the excavation target surface to the controller 40 through the target surface setting device 51.

The machine body position sensor 14 includes the pair of GNSS antennas 14*a* and 14*b* and computes the position of the machine body 1B (swing structure 12) and the orientation of the machine body 1B (swing structure 12) to output the computation result to the controller 40.

The external input device 96 is an input device that is operated by the operator and outputs an input signal corresponding to the operation to the controller 40. For example, the external input device 96 is a touch sensor of a capacitive type disposed on a display screen of the display device 53. Moreover, the external input device 96 may be one including a plurality of switches and levers.

FIG. 5 is a diagram illustrating one example of the display screen of the display device 53. As illustrated in FIG. 5, the display device 53 displays various display images on the display screen on the basis of a display control signal from the controller 40. The display device 53 is, for example, a liquid crystal monitor of a touch panel type and is installed in the cab 16. As an MG function, the controller 40 causes the display screen of the display device 53 to display a display image representing the positional relation between the excavation target surface St and the work device 1A (for example, bucket 10). In the example illustrated in the diagram, an image representing the excavation target surface St and the bucket 10 is displayed, and the distance from the excavation target surface St to the tip part of the bucket 10 is displayed as a target surface distance H1. In reference to the excavation target surface St, the target surface distance H1 takes a positive value in the upward direction and takes a negative value in the downward direction. It is possible to make the display device 53 display the display image illustrated in FIG. 5 irrespective of whether or not a mode to execute the MC is set by a mode changeover switch (not illustrated) operated by the operator. The operator can operate the work device 1A with reference to this display image.

As illustrated in FIG. 4, the controller 40 is configured by a computer including a processing device 41 such as a CPU (Central Processing Unit), an MPU (Micro Processing Unit), or a DSP (Digital Signal Processor), a non-volatile memory 42 such as a ROM (Read Only Memory), a flash memory, or a hard disk drive, a volatile memory 43 referred to as what is generally called a RAM (Random Access Memory), an input interface 44, an output interface 45, and other peripheral circuits. These pieces of hardware cooperate to operate software and implement a plurality of functions. The controller 40 may be configured by one computer or may be configured by a plurality of computers. Furthermore, as the processing device 41, an ASIC (application specific integrated circuit), an FPGA (Field Programmable Gate Array), or the like can be used.

Programs that can execute various computations and various kinds of data such as thresholds are stored in the non-volatile memory 42. That is, the non-volatile memory 42 is a storage medium (storage device) that can read programs that implement functions of the present embodiment. The volatile memory 43 is a storage medium (storage device) that temporarily stores a computation result obtained by the processing device 41 and a signal input from the input interface 44. The processing device 41 is a device that loads the program stored in the non-volatile memory 42 into the volatile memory 43 and executes computation, and executes predetermined computation processing for data taken in from the input interface 44, the non-volatile memory 42, and the volatile memory 43 in accordance with the program.

The input interface 44 converts signals input from various devices (the posture sensor 50, the target surface setting device 51, the machine body position sensor 14, the electrical operation lever devices A1 to A3, the external input device 96, the pressure sensors 5*a* to 7*b*, 201*b*, 202*b*, and 203*b*, and the temperature sensor 19) to data that can be computed by the processing device 41. Moreover, the output interface 45 generates a signal for output according to a result of computation in the processing device 41 and outputs the signal to various devices (the regulators 201*a*, 202, and 203*a*, the solenoid valves 55*a* to 59*b*, and the display device 53).

The delivery capacity of each of the main pumps 201 to 203 changes through control of the respective regulators 201*a* to 203*a* by the controller 40. The spool of each of the flow control valves D1 to D6 is actuated and each of the hydraulic cylinders 5 to 7 is actuated through control of the respective solenoid valves 55*a* to 59*b* by the controller 40. A predetermined image is displayed on the display screen of the display device 53 through control of the display device 53 by the controller 40.

—Functions of Controller—

Figure 6:
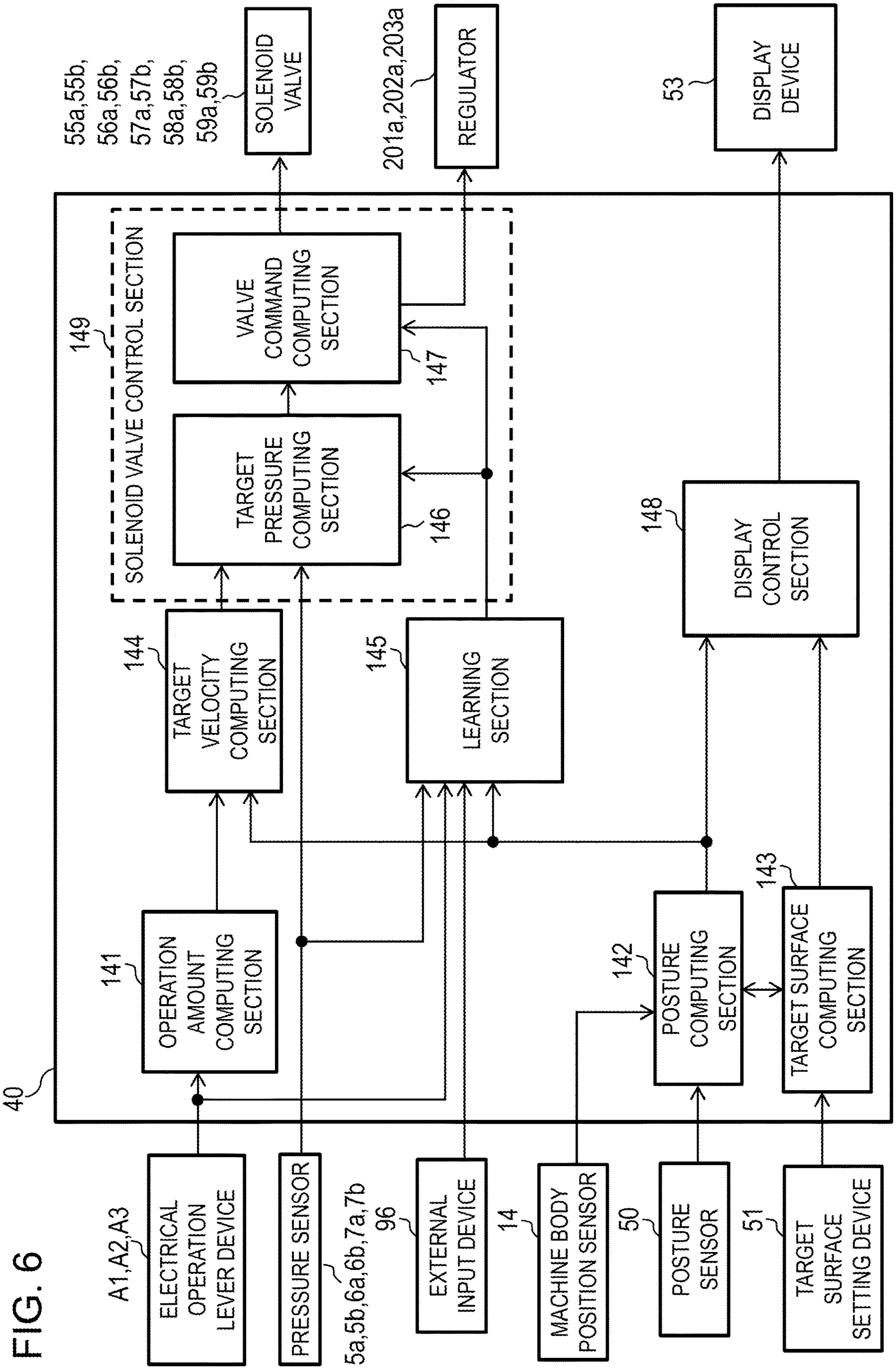
FIG. 6 is a functional block diagram of a controller according to a first embodiment.

Details of functions of the controller 40 will be described with reference to FIG. 6. FIG. 6 is a functional block diagram of the controller 40. The controller 40 functions as an operation amount computing section 141, a posture computing section 142, a target surface computing section 143, a target velocity computing section 144, a learning section 145, a target pressure computing section 146, a valve command computing section 147, and a display control section 148 by executing programs stored in the non-volatile memory 42. The target pressure computing section 146 and the valve command computing section 147 function as a solenoid valve control section 149 that controls the hydraulic cylinders 5, 6, and 7, which are hydraulic actuators, by controlling the solenoid valves 55*a* to 59*b*.

—Operation Amount Computing Section—

The operation amount computing section 141 computes a target value (hereinafter, referred to also as an operation amount operation pressure) Pi0 of the operation pressure generated by any of the solenoid valves 55*a* to 59*b*, on the basis of an operation signal (operation amount and operation direction) of the electrical operation lever device A1, A2, or A3. The operation amount computing section 141 computes a target value PiBM1200 of the operation pressure generated by the solenoid valve 55*a* and a target value PiBM300 of the operation pressure generated by the solenoid valve 56*a* when boom raising operation is executed by the electrical operation lever device A1. The operation amount computing section 141 computes a target value PiBM12D0 of the operation pressure generated by the solenoid valve 55*b* and a target value PiBM3D0 of the operation pressure generated by the solenoid valve 56*b* when boom lowering operation is executed by the electrical operation lever device A1.

The operation amount computing section 141 computes a target value PiAM1C0 of the operation pressure generated by the solenoid valve 57*a* and a target value PiAM2C0 of the operation pressure generated by the solenoid valve 58*a* when arm pulling (arm crowding) operation is executed by the electrical operation lever device A2. The operation amount computing section 141 computes a target value PiAM1D0 of the operation pressure generated by the solenoid valve 57*b* and a target value PiAM2D0 of the operation pressure generated by the solenoid valve 58*b* when arm pushing (arm dumping) operation is executed by the electrical operation lever device A2.

The operation amount computing section 141 computes a target value PiBKC0 of the operation pressure generated by the solenoid valve 59*a* when bucket pulling (bucket crowding) operation is executed by the electrical operation lever device A3. The operation amount computing section 141 computes a target value PiBKD0 of the operation pressure generated by the solenoid valve 59*b* when bucket pushing (bucket dumping) operation is executed by the electrical operation lever device A3.

—Posture Computing Section—

The posture computing section 142 computes the posture of the work device 1A and the tip position Pb of the bucket 10 in the excavator-based coordinate system (local coordinate system) on the basis of posture information (angle information) sensed by the posture sensor 50 and dimension information (L1, L2, L3) of the work device 1A stored in the non-volatile memory 42. The tip position Pb (Xbk, Zbk) of the bucket 10 can be computed by (expression 1) and (expression 2) as already described. When the posture of the work device 1A and the tip position of the bucket 10 in the global coordinate system are necessary, the posture computing section 142 transforms coordinates in the excavator-based coordinate system to coordinates in the global coordinate system on the basis of the position and the orientation of the swing structure 12 in the global coordinate system, sensed by the machine body position sensor 14.

—Target Surface Computing Section—

The target surface computing section 143 sets the excavation target surface St on the basis of information from the target surface setting device 51. Specifically, the target surface computing section 143 computes position information of the excavation target surface St on the basis of the information from the target surface setting device 51 and stores the computation result in the volatile memory 43. The target surface computing section 143 computes, as the two-dimensional excavation target surface St, a sectional shape (see FIG. 3) obtained by cutting an excavation target surface provided as three-dimensional data through the target surface setting device 51 by the plane along which the work device 1A moves (action plane of the work device).

Although the number of excavation target surfaces St is one in FIG. 3, a plurality of excavation target surfaces St are present in some cases. When a plurality of excavation target surfaces St are present, the target surface computing section 143 sets one closest to the tip part of the bucket 10, one located on the vertically lower side of the tip part of the bucket 10, or one freely selected, as the excavation target surface St of the computation target.

—Target Velocity Computing Section—

The target velocity computing section 144 computes a target velocity of the respective hydraulic cylinders 5, 6, and 7 in such a manner that the lower side relative to the excavation target surface St is not excavated beyond the excavation target surface St by the work device 1A in the area limiting control (ground leveling control). The target velocity computing section 144 computes the target velocity of the respective hydraulic cylinders 5, 6, and 7 on the basis of the result of computation in the posture computing section 142 and the result of computation in the operation amount computing section 141.

Figure 7:
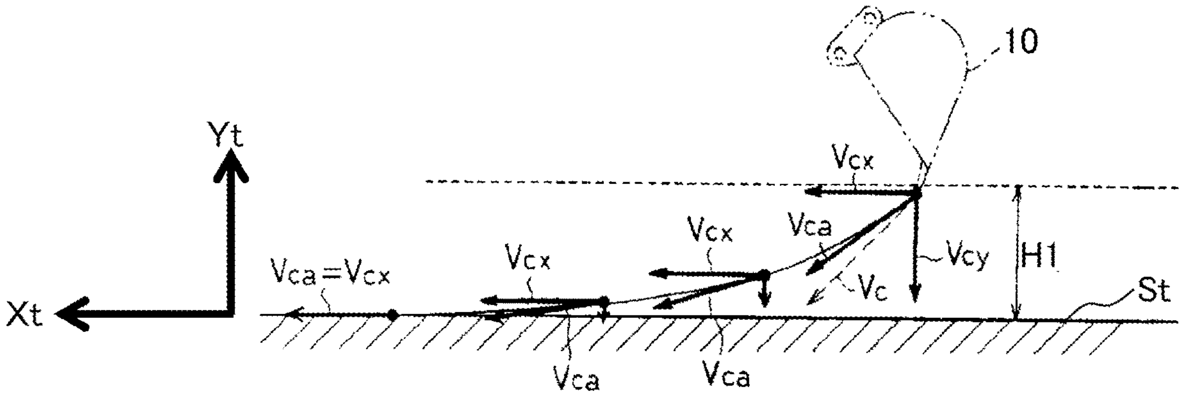
FIG. 7 is a diagram illustrating one example of a locus of a tip of a bucket when the tip of the bucket is controlled according to a target velocity vector Vca obtained after correction.

With reference to FIG. 7, a computation method of the target velocity in the area limiting control will be described in detail. FIG. 7 is a diagram illustrating one example of the locus of the tip of the bucket 10 when the tip of the bucket 10 is controlled according to a target velocity vector Vca obtained after correction. In the explanation made here, an Xt-axis and a Yt-axis are set as illustrated in FIG. 7. The Xt-axis is an axis parallel to the excavation target surface St and the Yt-axis is an axis orthogonal to the excavation target surface St.

The target velocity computing section 144 computes a primary target velocity of the respective hydraulic cylinders 5, 6, and 7 on the basis of the operation amount operation pressure Pi0 (PiBM12U0, PiBM3U0, PiBM12D0, PiBM3D0, PiAM1C0, PiAM2C0, PiAM1D0, PiAM2D0, PiBKC0, PiBKD0) of the solenoid valves 55*a* to 59*b* computed by the operation amount computing section 141.

The target velocity computing section 144 computes a target velocity vector Vc of the tip part of the bucket 10 illustrated in FIG. 7 on the basis of the primary target velocity of the respective hydraulic cylinders 5, 6, and 7, the tip position Pb of the bucket 10 computed by the posture computing section 142, and the dimension information (L1, L2, L3) of the work device 1A stored in the non-volatile memory 42.

The target velocity computing section 144 computes a secondary target velocity through correcting the primary target velocity of the necessary hydraulic cylinder in the hydraulic cylinders 5, 6, and 7 in such a manner that a component Vcy perpendicular to the excavation target surface St (velocity component in the Yt-axis direction) in the target velocity vector Vc of the tip part of the bucket 10 comes closer to 0 (zero) as the target surface distance H1, which is the distance between the tip part of the bucket 10 and the excavation target surface St, comes closer to 0 (zero). As a result, the target velocity vector Vc of the tip part of the bucket 10 is converted to the post-correction target velocity vector Vca. The target velocity vector Vca when the target surface distance H1 is 0 (zero) is only a component Vcx parallel to the excavation target surface St (velocity component in the Xt-axis direction). Hence, in the area limiting control, the tip part (control point) of the bucket 10 is held on the excavation target surface St or on the upper side thereof to prevent the tip part of the bucket 10 from entering an area on the lower side relative to the excavation target surface St. Hereinafter, the control to convert (correct) the velocity vector of the tip part of the bucket 10 in this manner will also be referred to as direction conversion control.

There are a case in which the direction conversion control is executed by a combination of boom raising or boom lowering and arm crowding and a case in which the direction conversion control is executed by a combination of boom raising or boom lowering and arm dumping. In either case, when the target velocity vector Vc includes a downward component ($Vcy<0$) that causes approach to the excavation target surface St, the target velocity computing section 144 computes such a target velocity of the boom cylinder 5 in the boom raising direction as to cancel out the downward component. Conversely, when the target velocity vector Vc includes an upward component (Vcy>0) that causes separation from the excavation target surface St, the target velocity computing section 144 computes such a target velocity of the boom cylinder 5 in the boom lowering direction as to cancel out the upward component.

When a mode in which the area limiting control (ground leveling control) is not to be executed is set by the mode changeover switch (not illustrated), the target velocity computing section 144 does not execute the correction for the primary target velocity of the respective hydraulic cylinders 5 to 7 according to operation of the respective electrical operation lever devices A1 to A3.

In this manner, the target velocity computing section 144 computes the target velocity that is the target value of the extension velocity/contraction velocity of the hydraulic cylinders 5, 6, and 7 on the basis of the results of computation by the operation amount computing section 141 and the posture computing section 142.

—Target Pressure Computing Section—

The target pressure computing section 146 calculates a differential pressure ΔP across the respective flow control valves D1 to D6 on the basis of the result of sensing by the pressure sensors 5*a*, 5*b*, 6*a*, 6*b*, 7*a*, 7*b*, 201*b*, 202*b*, and 203*b*. The target pressure computing section 146 computes a target opening area A of the respective flow control valves D1 to D6 by the following (expression 3) on the basis of the calculated differential pressure ΔP across the respective flow control valves D1 to D6, a flow rate coefficient C of the respective flow control valves D1 to D6, and a target flow rate Q of the hydraulic operating fluid that passes through the respective flow control valves D1 to D6.

$$A = Q/C\sqrt{\Delta P} \qquad \text{(expression 3)}$$

In the present embodiment, A is a target opening area (hereinafter, referred to also as a meter-out target opening area) Aout of a meter-out passage part of the flow control valves D1 to D6, and Q is a target flow rate Qout of the hydraulic operating fluid that passes through the meter-out passage part of any of the flow control valves D1 to D6. Furthermore, C is a flow rate coefficient Co of the meter-out passage part of any of the flow control valves D1 to D6, and ΔP is a differential pressure ΔPo across the meter-out passage part of any of the flow control valves D1 to D6.

That is, the target pressure computing section 146 according to the present embodiment computes the meter-out target opening area Aout of the respective flow control valves D1 to D6 by using the following (expression 4) of the orifice.

$$Aout = Qout/Co\sqrt{\Delta Po} \qquad \text{(expression 4)}$$

Here, the differential pressure ΔPo across the meter-out passage part is obtained by subtracting a tank pressure Pt stored in the non-volatile memory 42 in advance from a pressure Pao of the meter-out side (outlet side) of the respective hydraulic cylinders 5 to 7 sensed by the pressure sensor 5*a*, 5*b*, 6*a*, 6*b*, 7*a*, or 7*b* (ΔPo=Pao−Pt). As the tank pressure Pt, a pressure sensed by a pressure sensor (not illustrated) attached to the tank or a return line to the tank may be employed. The target flow rate Qout is obtained by converting the target velocity of the respective hydraulic cylinders 5 to 7 computed by the target velocity computing section 144 to the flow rate of the meter-out side of the respective hydraulic cylinders 5 to 7.

The main pump (flow control valve) preferentially used when the boom 8 and the arm 9 are operated is set in advance. When a target flow rate Qin of the hydraulic operating fluid supplied to any of the hydraulic cylinders 5 to 7 exceeds the maximum flow rate (referred to also as a maximum delivery flow rate) at which delivery can be executed from the first main pump (hereinafter, referred to also as a preferred first pump), the second main pump (hereinafter, referred to also as a preferred second pump) is used. The target flow rate Qin is obtained by converting each target velocity computed by the target velocity computing section 144 to the flow rate of the meter-in side (inlet side) of the respective hydraulic cylinders 5 to 7.

In the present embodiment, the preferred first pump of the boom 8 is the third main pump 203, and the preferred second pump of the boom 8 is the first main pump 201. Moreover, the preferred first pump of the arm 9 is the second main pump 202, and the preferred second pump of the arm 9 is the first main pump 201. When the bucket 10 is operated, there is no pump preferentially used. The bucket 10 is always operated by the hydraulic operating fluid supplied from the first main pump 201.

In the present embodiment, the flow control valve D1 and the flow control valve D2 are not configured to be individually controlled. Thus, the preferred second pump of the boom 8 is substantially the first main pump 201 and the second main pump 202. However, using the first main pump 201 as the preferred second pump is allowed by designing the openings of meter-in passage parts of the flow control valves D1 and D2 in such a manner that the flow control valve D1, to which the hydraulic operating fluid is supplied from the first main pump 201, starts to open earlier than the flow control valve D2.

The target flow rate Q of the respective hydraulic cylinders 5 to 7 is distributed into a target flow rate (hereinafter, a first target flow rate) 01 of the preferred first pump and a target flow rate (hereinafter, a second target flow rate) 02 of the preferred second pump. When the maximum flow rate at which delivery can be executed from one main pump is defined as Qmax, in the case of Q>Qmax, Q1=Qmax and Q2=Q−Qmax hold. Moreover, in the case of Q<Qmax, Q1=Q and Q2=0 hold.

In the case of boom raising, the meter-out target opening area Aout_Bm3U of the flow control valve D3 is computed by (expression 4) on the basis of the first target flow rate Qout1BmU and the pressure of the rod chamber of the boom cylinder 5 sensed by the pressure sensor 5*a*. Moreover, in the case of boom raising, the meter-out target opening area Aout_Bm1U of the flow control valve D1 is computed by (expression 4) on the basis of the second target flow rate Qout2BmU and the pressure of the rod chamber of the boom cylinder 5 sensed by the pressure sensor 5*a*.

In the case of boom lowering, the meter-out target opening area Aout_Bm3D of the flow control valve D3 is computed by (expression 4) on the basis of the first target flow rate Qout1BmD and the pressure of the bottom chamber of the boom cylinder 5 sensed by the pressure sensor 5*b*. Further, in the case of boom lowering, the meter-out target opening area Aout_Bm1D of the flow control valve D1 is computed by (expression 4) on the basis of the second target flow rate Qout2BmD and the pressure of the bottom chamber of the boom cylinder 5 sensed by the pressure sensor 5*b*.

In the case of arm pulling, the meter-out target opening area Aout_Am1C of the flow control valve D4 is computed by (expression 4) on the basis of the first target flow rate Qout1AmC and the pressure of the rod chamber of the arm cylinder 6 sensed by the pressure sensor 6*a*. Moreover, in the case of arm pulling, the meter-out target opening area Aout_Am2C of the flow control valve D5 is computed by (expression 4) on the basis of the second target flow rate Qout2AmC and the pressure of the rod chamber of the arm cylinder 6 sensed by the pressure sensor 6*a*.

In the case of arm pushing, the meter-out target opening area Aout_Am1D of the flow control valve D4 is computed by (expression 4) on the basis of the first target flow rate Qout1AmD and the pressure of the bottom chamber of the arm cylinder 6 sensed by the pressure sensor 6*b*. Further, in the case of arm pushing, the meter-out target opening area Aout_Am2D of the flow control valve D5 is computed by (expression 4) on the basis of the second target flow rate Qout2AmD and the pressure of the bottom chamber of the arm cylinder 6 sensed by the pressure sensor 6*b*.

In the case of bucket pulling, the meter-out target opening area Aout_BkC of the flow control valve D6 is computed by (expression 4) on the basis of the first target flow rate Qout1BkC and the pressure of the rod chamber of the bucket cylinder 7 sensed by the pressure sensor 7*a*. Moreover, in the case of bucket pushing, the meter-out target opening area Aout_BkD of the flow control valve D6 is computed by (expression 4) on the basis of the first target flow rate Qout1BkD and the pressure of the bottom chamber of the bucket cylinder 7 sensed by the pressure sensor 7*b*.

As described above, in the present embodiment, when the meter-in target flow rate Qin of each of the boom 8, the arm 9, and the bucket 10 is equal to or lower than the maximum delivery flow rate of one main pump, one main pump can be assigned to one hydraulic cylinder. Hence, the respective hydraulic cylinders 5 to 7 can be operated with accuracy very close to the target flow rate (target velocity) by the opening of the flow control valve derived by (expression 4), without being affected by flow dividing.

Figure 8:
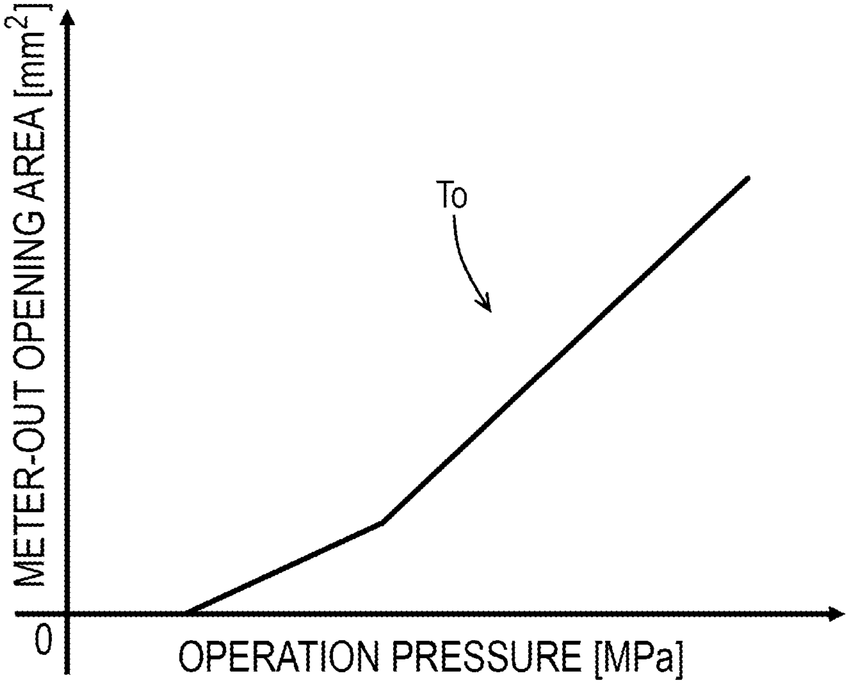
FIG. 8 is an opening line diagram of a meter-out passage part of flow control valves and illustrates the relation between an operation pressure input to pressure receiving chambers of the flow control valves and an opening area of the meter-out passage part of the flow control valves.

With reference to FIG. 8, description will be made of one example of an opening characteristic of the meter-out passage part of the flow control valves D1 to D6. FIG. 8 is an opening line diagram of the meter-out passage part of the flow control valves D1 to D6 and illustrates the relation between the operation pressure input to the pressure receiving chambers E1 to E12 of the flow control valves D1 to D6 and the opening area of the meter-out passage part of the flow control valves D1 to D6. As illustrated in FIG. 8, as the operation pressure generated by the respective solenoid valves 55*a* to 59*b* increases, the opening area of the meter-out passage part of the flow control valves D1 to D6 becomes larger. An opening characteristic table To that defines the relation between the operation pressure and the opening area of the flow control valves D1 to D6 is stored in the non-volatile memory 42 of the controller 40.

The target pressure computing section 146 refers to the opening characteristic table To and computes a target operation pressure Pi1 (PiBM12U1, PiBM3U1, PiBM12D1, PiBM3D1, PiAM1C1, PiAM2C1, PiAM1D1, PiAM2D1, PiBKC1, PiBKD1) that is a target value of the operation pressure on the basis of the meter-out target opening area Aout (Aout_Bm1U, Aout_Bm3U, Aout_Bm1D, Aout_Bm3D, Aout_Am1C, Aout_Am2C, Aout_Am1D, Aout_Am2D, Aout_BkC, Aout_BkD).

In the present embodiment, the opening characteristic table To is corrected on the basis of the result of learning processing to be described later. That is, the target pressure computing section 146 refers to the corrected opening characteristic table To and computes the target operation pressure Pi1 on the basis of the meter-out target opening area Aout. A correction method of the opening characteristic table To will be described later.

The target pressure computing section 146 computes the sums of the target flow rates of the meter-in side of the respective hydraulic cylinders 5 to 7 assigned to the respective main pumps 201, 202, and 203 as target flow rates Q201, Q202, and Q203 of the respective main pumps 201, 202, and 203. That is, the target pressure computing section 146 computes the target flow rate Q201 of the first main pump 201 by the following (expression 5), computes the target flow rate Q202 of the second main pump 202 by the following (expression 6), and computes the target flow rate Q203 of the third main pump 203 by the following (expression 7).

$$Q201 = Qin1Bm1U + Qin1Am2C + Qin1Am2D + Qin1BkC + Qin1BkD \quad \text{(expression 5)}$$

$$Q202 = Qin2Bm2U + Qin2Am1C + Qin2Am1D \quad \text{(expression 6)}$$

$$Q203 = Qin3Bm3U \quad \text{(expression 7)}$$

Here, Qin1Bm1U is the target flow rate of the meter-in side regarding the hydraulic operating fluid supplied from the first main pump 201 to the boom cylinder 5 through the flow control valve D1 in the case of boom raising. Qin1Am2C is the target flow rate of the meter-in side regarding the hydraulic operating fluid supplied from the first main pump 201 to the arm cylinder 6 through the flow control valve D5 in the case of arm pulling. Qin1Am2D is the target flow rate of the meter-in side regarding the hydraulic operating fluid supplied from the first main pump 201 to the arm cylinder 6 through the flow control valve D5 in the case of arm pushing. Qin1BkC is the target flow rate of the meter-in side regarding the hydraulic operating fluid supplied from the first main pump 201 to the bucket cylinder 7 through the flow control valve D6 in the case of bucket pulling. Qin1BkD is the target flow rate of the meter-in side regarding the hydraulic operating fluid supplied from the first main pump 201 to the bucket cylinder 7 through the flow control valve D6 in the case of bucket pushing. Qin2Bm2U is the target flow rate of the meter-in side regarding the hydraulic operating fluid supplied from the second main pump 202 to the boom cylinder 5 through the flow control valve D2 in the case of boom raising. Qin2Am1C is the target flow rate of the meter-in side regarding the hydraulic operating fluid supplied from the second main pump 202 to the arm cylinder 6 through the flow control valve D4 in the case of arm pulling. Qin2Am1D is the target flow rate of the meter-in side regarding the hydraulic operating fluid supplied from the second main pump 202 to the arm cylinder 6 through the flow control valve D4 in the case of arm pushing. Qin3Bm3U is the target flow rate of the meter-in side regarding the hydraulic operating fluid supplied from the third main pump 203 to the boom cylinder 5 through the flow control valve D3 in the case of boom raising.

In the non-volatile memory 42, regulator pressure tables that define the relation between the target flow rates Q201, Q202, and Q203 of the main pumps 201, 202, and 203 and the target regulator pressures of the regulators 201*a*, 202*a*, and 203*a* are stored in advance. The regulator pressure table is defined for each of the main pumps 201, 202, and 203.

The target pressure computing section 146 refers to the regulator pressure tables and computes the target regulator pressures PPc201, PPc202, and PPc203 on the basis of the computed target flow rates Q201, Q202, and Q203 of the main pumps 201, 202, and 203.

—Valve Command Computing Section—

The valve command computing section 147 computes an electrical signal based on the target operation pressure Pi1 (PiBM12U1, PiBM3U1, PiBM12D1, PiBM3D1, PiAM1C1, PiAM2C1, PiAM1D1, PiAM2D1, PiBKC1, PiBKD1) computed by the target pressure computing section 146 and outputs the computed electrical signal to the corresponding one of the solenoid valves 55*a* to 59*b*. Further, the valve command computing section 147 computes an electrical signal based on the target regulator pressure PPC (PPC201, PPc202, PPC203) computed by the target pressure computing section 146 and outputs the computed electrical signal to the regulator solenoid valve of the corresponding one of the regulators 201*a* to 203*a*.

The solenoid of the respective solenoid valves 55*a* to 59*b* is excited by the electrical signal (excitation current) output from the valve command computing section 147. This actuates the respective solenoid valves 55*a* to 59*b*, and the operation pressure (pilot pressure) that acts on the respective flow control valves D1 to D6 is controlled to the target operation pressure Pi1 computed by the target pressure computing section 146. This causes the operating velocity of the respective hydraulic cylinders 5 to 7 to be controlled to the target velocity. Moreover, the solenoid of the regulator solenoid valve of the respective regulators 201*a* to 203*a* is excited by the electrical signal (excitation current) output from the valve command computing section 147. This actuates the regulator solenoid valve, and the regulator pressure (pilot pressure) that acts on the pressure receiving part of the respective regulators 201*a* to 203*a* is controlled to the target regulator pressure PPC computed by the target pressure computing section 146. This causes the delivery flow rate of the respective main pumps 201 to 203 to be controlled to the respective target flow rate Q201, Q202, or Q203.

As described above, the controller 40 according to the present embodiment computes the target flow rate Q of the hydraulic operating fluid that passes through the respective flow control valves D1 to D6 from the target velocity of the respective hydraulic cylinders 5 to 7 and computes the target opening area A of the respective flow control valves D1 to D6 by using (expression 3) of the orifice on the basis of the target flow rate Q and the differential pressure ΔP across the respective flow control valves D1 to D6. The differential pressure ΔP across the flow control valves D1 to D6 is calculated on the basis of the load pressure of the respective hydraulic cylinders 5 to 7 (in the present embodiment, load pressure of the meter-out side of the respective hydraulic cylinders 5 to 7). Hereinafter, the load pressure of the respective hydraulic cylinders 5 to 7 will also be referred to as the cylinder pressure. The controller 40 then refers to the opening characteristic table To and computes the target operation pressure on the basis of the target opening area A. Further, the controller 40 controls the respective solenoid valves 55*a* to 59*b* to cause the operation pressure generated by the respective solenoid valves 55*a* to 59*b* to become the target operation pressure.

By computing the target operation pressure by using (expression 3) of the orifice in this manner, even when the load pressure of the hydraulic cylinder (hydraulic load condition) changes, the target opening area according to the load pressure can be obtained. Thus, the hydraulic cylinders 5 to 7 can be accurately operated at the computed target flow rate (target velocity) even when an open center system is employed as the hydraulic system. As a result, work by the MC such as the area limiting control can be accurately executed.

Here, in the relation between the opening area of the flow control valves D1 to D6 and the operation pressure generated by the solenoid valves 55*a* to 59*b*, variation occurs regarding each hydraulic excavator 1 due to manufacturing errors of the flow control valves D1 to D6. Among the manufacturing errors of the flow control valves D1 to D6 are a processing error of the spool of the respective flow control valves D1 to D6, variation in a spring constant of a spring for holding the spool at a neutral position (centering spring), a processing error of a valve casing that slidably holds the spool, and so forth.

Thus, in the present embodiment, in order to suppress the variation (individual difference) regarding each hydraulic excavator 1 caused by the manufacturing errors of the flow control valves D1 to D6, the controller 40 learns the relation between the opening area of the flow control valves D1 to D6 and the operation pressure generated by the solenoid valves 55*a* to 59*b*. Moreover, the controller 40 corrects the relation between the opening area of the flow control valves D1 to D6 and the operation pressure generated by the solenoid valves 55*a* to 59*b*, on the basis of the learning result.

The present embodiment has a configuration in which the operation pressure for operating one flow control valve in one direction can be generated by one solenoid valve, and the controller 40 executes the following learning processing. In the learning processing, the controller 40 changes in a stepwise manner the operation pressure generated by any of the solenoid valves 55*a* to 59*b* in the state in which a hydraulic operating fluid of a constant delivery flow rate is being supplied from the main pump 201, 202, or 203 to the respective hydraulic cylinders 5 to 7 through the respective flow control valves D1 to D6 of the learning target, and inputs the pressure of the respective hydraulic cylinders 5 to 7 sensed by the pressure sensor 5*a*, 5*b*, 6*a*, 6*b*, 7*a*, or 7*b*. Further, in the learning processing, the controller 40 stores the operation pressure when the input pressure of the respective hydraulic cylinders 5 to 7 has become a reference value Pta set in advance, as a learning result operation pressure Pisx. The reference value Pta is the pressure of the respective hydraulic cylinders 5 to 7 corresponding to the predetermined opening area Ad obtained in advance through an experiment using a prototype machine, or the like.

The opening area of the respective flow control valves D1 to D6 at the learning result operation pressure Pisx obtained by the learning processing is equivalent to the opening area Ad acquired by an experiment in advance. The controller 40 executes offset correction of the opening characteristic table To in such a manner that an operation pressure (reference value) Pita corresponding to the above-described opening area Ad corresponds with the learning result operation pressure Pisx. The controller 40 refers to the opening characteristic table To corrected on the basis of the learning result operation pressure Pisx and computes the target operation pressure Pi1 on the basis of the target opening area A.

By controlling the respective solenoid valves 55*a* to 59*b* on the basis of the target operation pressure Pi1 obtained in this manner, the respective hydraulic cylinders 5 to 7 can be accurately operated even when the respective flow control valves D1 to D6 involve a processing error or the like. The learning processing and the correction processing by the controller 40 according to the present embodiment will be described in detail below.

—Learning Section—

As illustrated in FIG. 6, the learning section 145 executes a learning mode when a command to execute the learning mode is input thereto by the external input device 96. In the learning mode, when the flow control valve employed as the learning target and the operation direction of the flow control valve are input by the external input device 96, the learning section 145 determines whether or not the posture of the work device 1A is a learning start posture defined in advance, on the basis of the result of computation by the posture computing section 142. In the present embodiment, at least the posture of the work device 1A being the learning start posture is employed as one of the conditions for starting the learning processing.

When it is determined that the posture of the work device 1A is the learning start posture and any of the electrical operation lever devices A1 to A3 is operated, the learning section 145 deems that the learning start condition is satisfied, and starts the learning processing. In the learning processing, the learning section 145 computes a learning operation pressure Pis (PiBM12Us, PiBM3Us, PiBM12Ds, PiBM3Ds, PiAM1Cs, PiAM2Cs, PiAM1Ds, PiAM2Ds, PiBKCs, PiBKDs) that is a target operation pressure for learning regarding the respective flow control valves D1 to D6 and a learning regulator pressure PPcs (PPc201*s*, PPc202*s*, PPc203*s*) that is a target regulator pressure for learning regarding the respective regulators 201*a*, 202*a*, and 203*a*. The learning section 145 outputs the computed learning operation pressure Pis and learning regulator pressure PPcs to the valve command computing section 147.

The valve command computing section 147 computes an electrical signal based on the learning operation pressure Pis computed by the learning section 145 and outputs the computed electrical signal to the respective solenoid valves 55*a* to 59*b* corresponding to the operation direction of the respective flow control valves D1 to D6 of the learning target. Further, the valve command computing section 147 computes an electrical signal based on the learning regulator pressure PPcs computed by the learning section 145 and outputs the computed electrical signal to the regulator solenoid valve of the respective regulators 201*a* to 203*a* of the respective main pumps 201 to 203 corresponding to the respective flow control valves D1 to D6 of the learning target.

While the learning processing is executed, the learning section 145 associates the cylinder pressure acquired from the pressure sensor 5*a*, 5*b*, 6*a*, 6*b*, 7*a*, or 7*b* with the learning operation pressure Pis and stores them. The learning section 145 changes the learning operation pressure Pis in a stepwise manner.

—Learning Processing—

Figure 9:
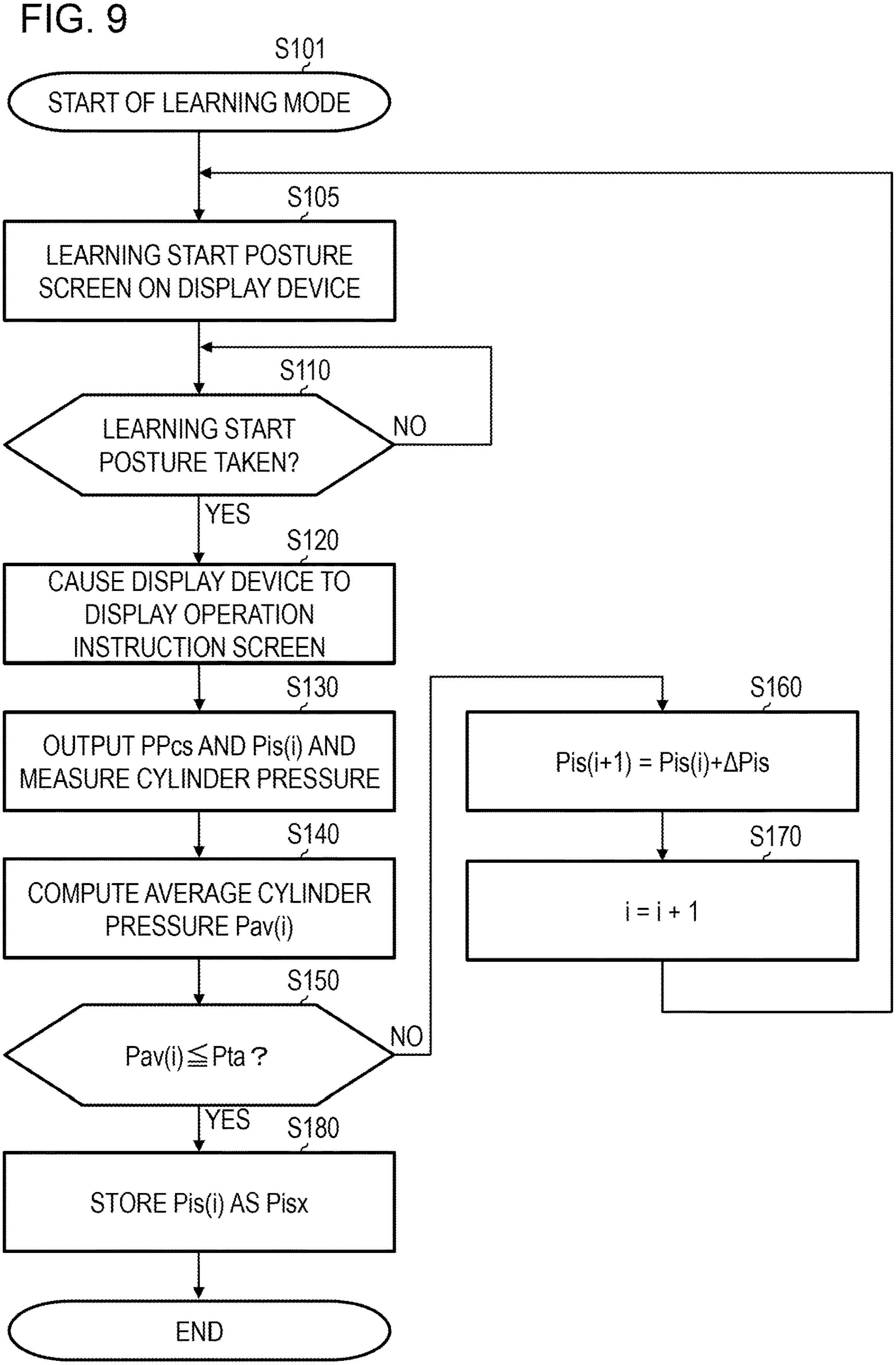
FIG. 9 is a flowchart illustrating one example of the flow of learning processing executed by the controller according to the first embodiment.

One example of the flow of the learning processing executed by the controller 40 will be described with reference to FIG. 9. FIG. 9 is a flowchart illustrating one example of the flow of the learning processing executed by the controller 40. When the external input device 96 is operated by an operator and a command to execute the learning mode is input from the external input device 96, the controller 40 starts the learning mode (step S101).

In step S101, the display control section 148 causes the display device 53 to display an initial screen of the learning mode. Included in the initial screen are a valve selection operation part for selecting the flow control valve employed as the learning target from the plurality of flow control valves D1 to D6, an operation direction selection part for selecting the operation direction of the selected flow control valve, and a selection completion operation part for making an instruction to complete the selection. When, by the operator, the flow control valve employed as the learning target is selected from the flow control valves D1 to D6, the operation direction of the selected flow control valve is selected, and an instruction to complete the selection is made, the processing proceeds to step S105.

In the following, description will be made by taking as an example a case in which, in step S101, the "flow control valve D3" in the flow control valves D1 to D6 is selected as the flow control valve of the learning target and the "boom raising direction" is selected as the operation direction of the flow control valve. When the flow control valve D3 of the learning target is selected and the boom raising direction is selected as the operation direction of the flow control valve D3 in step S101, the learning section 145 reads out learning start posture data associated with learning by boom raising operation from the non-volatile memory 42.

Figure 10:
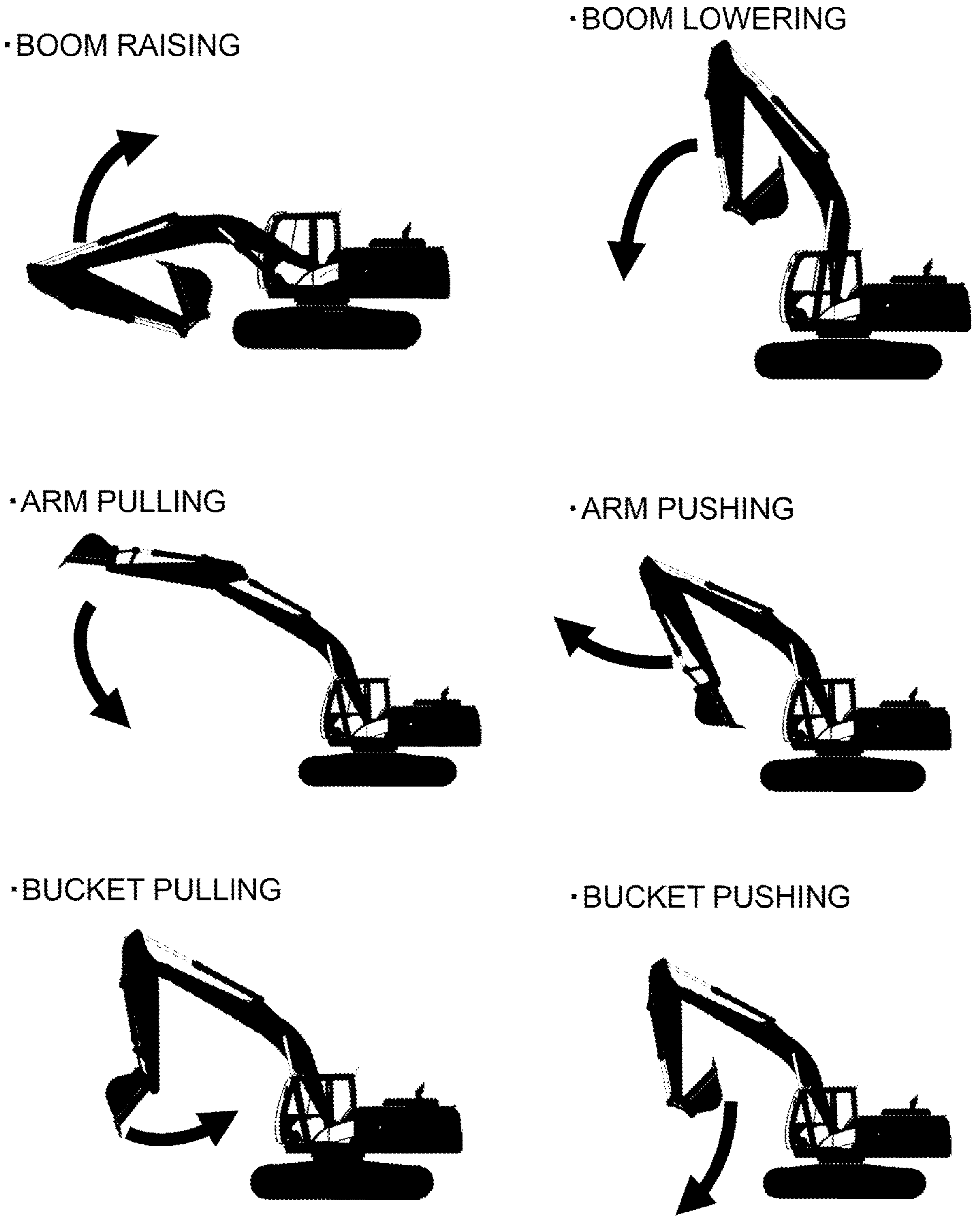
FIG. 10 is a diagram illustrating learning start postures corresponding to operation of boom raising, boom lowering, arm pulling, arm pushing, bucket pulling, and bucket pushing.

FIG. 10 is a diagram illustrating learning start postures corresponding to operation of boom raising, boom lowering, arm pulling, arm pushing, bucket pulling, and bucket pushing. Pieces of the learning start posture data that define the learning start postures illustrated in FIG. 10 are stored in the non-volatile memory 42. Stored in the non-volatile memory 42 are the learning start posture data for executing learning by boom raising operation, the learning start posture data for executing learning by boom lowering operation, the learning start posture data for executing learning by arm pulling operation, the learning start posture data for executing learning by arm pushing operation, the learning start posture data for executing learning by bucket pulling operation, and the learning start posture data for executing learning by bucket pushing operation.

The learning start posture data includes a target range (lower-limit value and upper-limit value) of the boom angle α, a target (lower-limit value and upper-limit value) of the arm angle β, and a target range (lower-limit value and upper-limit value) of the bucket angle γ. As illustrated in FIG. 10, the learning start posture data corresponding to boom raising defines the learning start posture in the state in which the boom 8 is lowered to such an extent that the bucket 10 does not come into contact with the ground surface.

Figure 11:
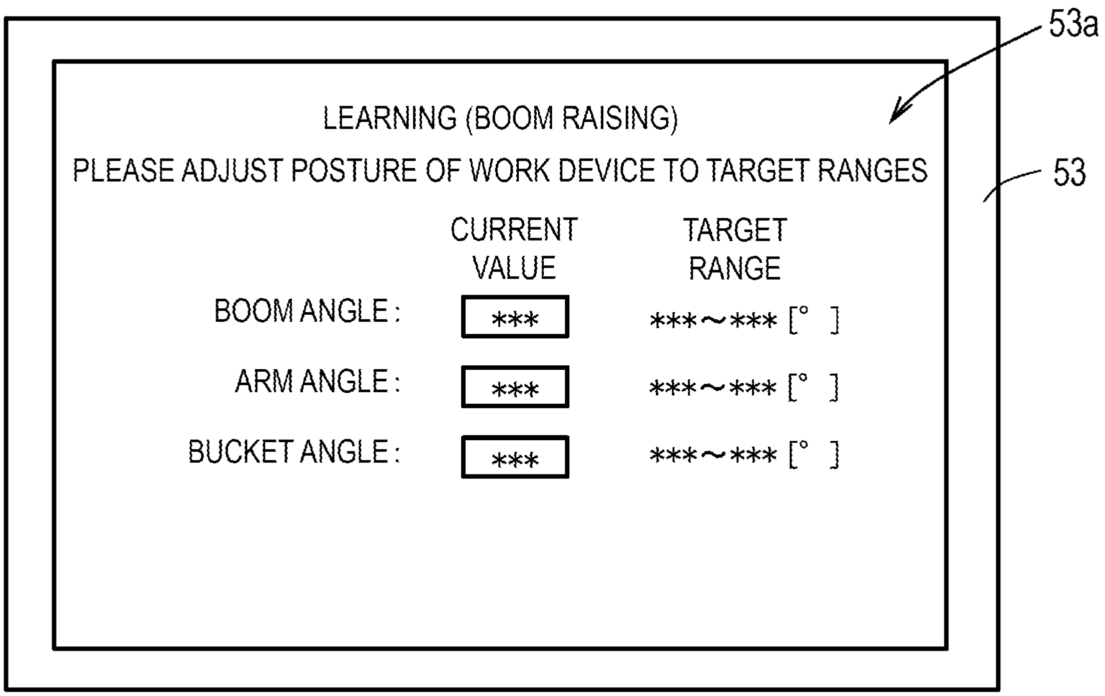
FIG. 11 is a diagram illustrating one example of a learning start posture screen.

As illustrated in FIG. 9, in step S105, the display control section 148 causes the display device 53 to display a learning start posture screen 53*a* (see FIG. 11). FIG. 11 is a diagram illustrating one example of the learning start posture screen 53*a*. As illustrated in FIG. 11, in the learning start posture screen 53*a*, a message that reads "please adjust posture of work device to target ranges." to prompt the operator to execute operation for setting the posture of the work device 1A to the learning start posture is displayed. Moreover, in the learning start posture screen 53*a*, the current values of the boom angle α, the arm angle β, and the bucket angle γ sensed by the angle sensors 30, 31, and 32 and the target ranges (lower-limit values and upper-limit values) of the boom angle α, the arm angle β, and the bucket angle γ included in the learning start posture data are displayed.

When the learning start posture screen 53*a* has been displayed on the display device 53 in step S105 in FIG. 9, the processing proceeds to step S110. In step S110, the learning section 145 determines whether or not the posture of the work device 1A is the learning start posture. When each of the current boom angle α, arm angle β, and bucket angle γ is within the target range of the boom angle α, the arm angle β, and the bucket angle γ defined in the learning start posture data of boom raising, the learning section 145 determines that the posture of the work device 1A is the learning start posture, and forwards the processing to step S120. When at least one of the current boom angle α, arm angle β, and bucket angle γ is not within the target range defined in the learning start posture data of boom raising, the learning section 145 determines that the posture of the work device 1A is not the learning start posture. The learning start posture determination processing of step S110 is repeatedly executed at a predetermined control cycle until the affirmative determination is made.

In step S120, the display control section 148 causes the display device 53 to display an operation instruction screen. An operation instruction that reads, for example, "please operate the boom operation lever to the raising side for five seconds or longer" is displayed in the operation instruction screen. When the operation instruction screen has been displayed in step S120, the processing proceeds to step S130.

When the electrical operation lever device A1 is operated to the boom raising side by the operator in step S130, the learning processing is started. While the electrical operation lever device A1 is operated, the learning section 145 outputs the learning regulator pressure PPcs and the learning operation pressure Pis(i) to the valve command computing section 147 and measures the cylinder pressure. Thus, the learning regulator pressure PPcs and the learning operation pressure Pis(i) are synchronously output. Here, the cylinder pressure measured in the learning of boom raising is the pressure of the meter-out side of the boom cylinder 5 sensed by the pressure sensor 5*a*. Further, the learning operation pressure Pis is the learning operation pressure PiBM3Us used for control of the solenoid valve 56*a* for boom raising.

The learning regulator pressure PPcs is the learning regulator pressure PPc203*s* used for control of the third regulator 203*a* of the third main pump 203. As a result of the output of the learning regulator pressure PPc203*s* to the valve command computing section 147 by the learning section 145, the hydraulic operating fluid at a flow rate Qc equal to or higher than a certain flow rate is delivered from the third main pump 203.

The flow rate Qc is a flow rate that is higher than the flow rate at a standby time (flow rate with the minimum tilting) and allows the boom cylinder 5 to stably move at a velocity equal to or higher than a certain velocity. For example, the flow rate Qc is a flow rate that can place a certain degree of load of approximately 10 [Mpa] on the boom cylinder 5 even when the meter-out opening is sufficiently open. The learning section 145 outputs the minimum value of the regulator pressure to the valve command computing section 147 as the target value of the regulator pressure of the first regulator 201*a* and the second regulator 202*a* in order to cause delivery from the first main pump 201 and the second main pump 202 at the flow rate at the standby time.

The learning section 145 outputs the learning operation pressure Pis(i) to the valve command computing section 147 for a time Δta during which the boom raising operation is executed. i is a natural number and denotes the number of learning steps to be described later. As the number i of learning steps, 1 is set (i=1) in step S101. The learning section 145 outputs the minimum value of the operation pressure to the valve command computing section 147 as the target value of the operation pressure of the flow control valves D1, D2, and D4 to D6 other than the flow control valve D3.

In step S130, the valve command computing section 147 computes an electrical signal corresponding to the target value of the regulator pressure (learning regulator pressure) output from the learning section 145 and outputs the computed electrical signal to the corresponding regulator solenoid valve. Moreover, the valve command computing section 147 computes an electrical signal corresponding to the target value of the operation pressure (learning operation pressure) output from the learning section 145 and outputs the computed electrical signal to the corresponding one of the solenoid valves 55*a* to 59*b*.

The learning section 145 associates the clock time, the cylinder pressure of the meter-out side of the boom cylinder 5 sensed by the pressure sensor 5*a*, the learning regulator pressure PPcs, and the learning operation pressure Pis(i) and stores them. In this manner, in step S130, the controller 40 outputs the electrical signals for generating the learning regulator pressure PPcs and the learning operation pressure Pis(i) for the time Δta during which the electrical operation lever device A1 is operated, and measures the cylinder pressure to forward the processing to step S140.

In step S140, the learning section 145 computes an average (hereinafter, referred to also as an average cylinder pressure) Pav(i) of the cylinder pressure on the basis of the cylinder pressure measured in step S130, and forwards the processing to step S150.

In step S150, the learning section 145 determines whether or not the average cylinder pressure Pav(i) computed in step S140 is equal to or lower than the pressure threshold Pta set in advance. The pressure threshold Pta is the reference value (design value) of the pressure of the boom cylinder 5 when the hydraulic operating fluid at the flow rate Qc is delivered from the third main pump 203 and the predetermined operation pressure Pita is input to the flow control valve D3 in order to set the flow control valve D3 to have the predetermined opening area Ad from the learning start posture for boom raising. For example, the pressure threshold Pta is the cylinder pressure of the meter-out side of the flow control valve D3 in boom raising in-air operation in a velocity region of a high use frequency in the area limiting control and is set in advance on the basis of a desk calculation, an experiment using a prototype machine, or the like.

When it is determined that the average cylinder pressure Pav(i) is higher than the pressure threshold Pta in step S150, the learning section 145 determines that the pressure of the boom cylinder 5 has not become the reference value (Pta), and forwards the processing to step S160.

In step S160, the learning section 145 computes the learning operation pressure Pis(i+1) to be used in the next learning, by adding a predetermined rising pressure ΔPis to the learning operation pressure Pis(i), and forwards the processing to step S170. In step S170, the learning section 145 executes count-up processing of adding one to the number i of learning steps to employ the addition result as new i, and returns to step S105.

When it is determined that the average cylinder pressure Pav(i) is equal to or lower than the pressure threshold Pta in step S150, the learning section 145 determines that the pressure of the boom cylinder 5 has become the reference value (Pta), and forwards the processing to step S180. In step S180, the learning section 145 stores the learning operation pressure Pis(i) when the pressure of the boom cylinder 5 has become the reference value, as the learning result operation pressure Pisx, and ends the processing illustrated in the flowchart of FIG. 9. The display control section 148 causes the display device 53 to display the end of the learning processing.

Figure 12:
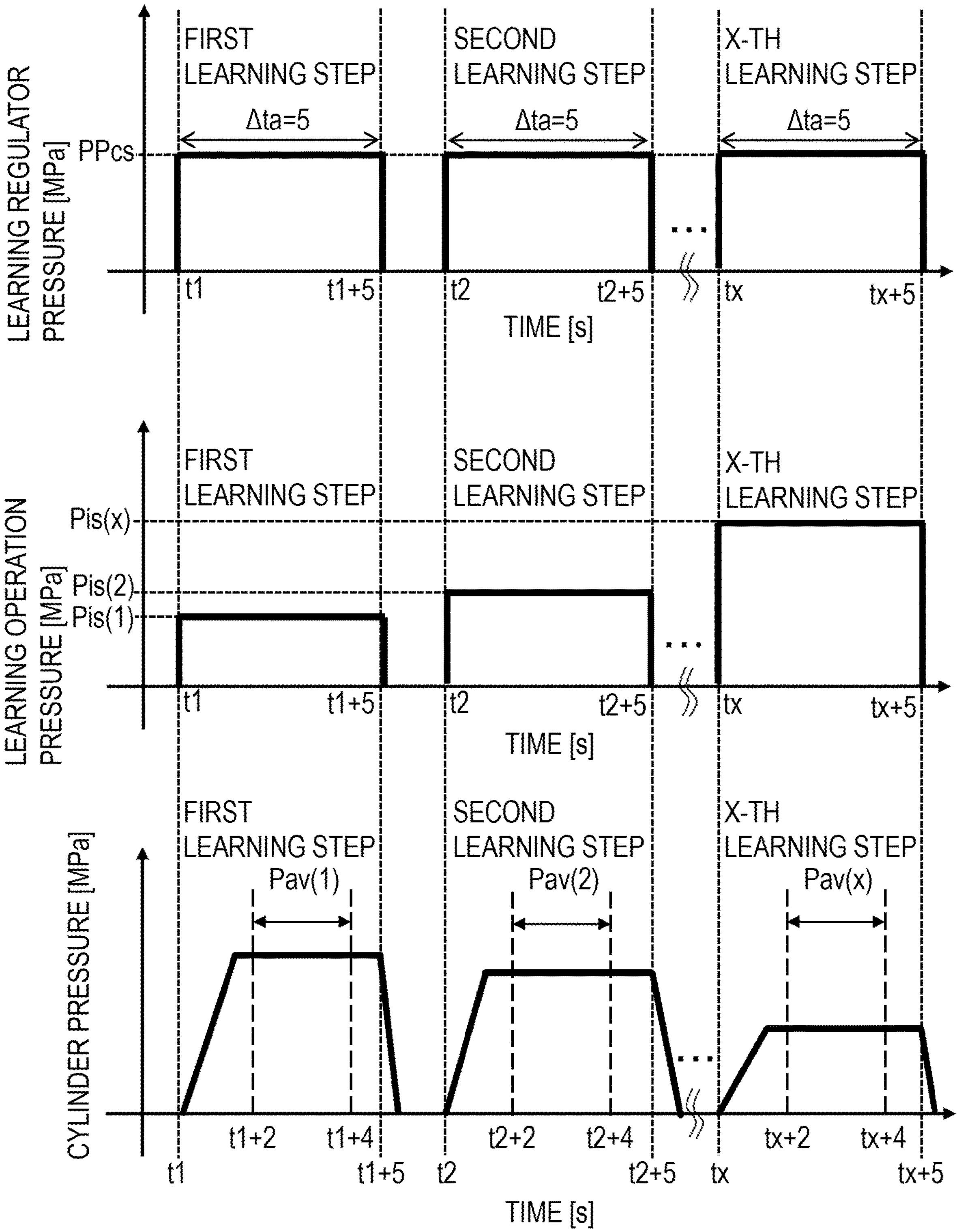
FIG. 12 is a diagram illustrating a time change in a learning regulator pressure and a learning operation pressure output from a learning section according to the first embodiment to a valve command computing section and the cylinder pressure of the meter-out side sensed by a pressure sensor.

FIG. 12 is a diagram illustrating a time change in the learning regulator pressure and the learning operation pressure output from the learning section 145 to the valve command computing section 147 and the cylinder pressure of the meter-out side sensed by the respective pressure sensors 5*a* to 7*b*. As illustrated in FIG. 12, in a first learning step (the number i of learning steps=1), the learning section 145 outputs the learning regulator pressure PPcs to the valve command computing section 147 for the time Δta (for example, five seconds) during which boom raising operation is executed from a clock time t1. Further, the learning section 145 outputs the learning operation pressure Pis(1) to the valve command computing section 147 for the time Δta from the clock time t1.

The cylinder pressure starts to rise from the clock time t1 and is thereafter kept at an almost constant value and starts to decrease from a clock time t1+5. The learning section 145 computes the average of the cylinder pressure when the cylinder pressure is kept at the almost constant value. Specifically, the learning section 145 computes the average Pav(1) of the cylinder pressure acquired from a clock time t1+2 to a clock time t1+4.

When the average cylinder pressure Pav(1) is larger than the pressure threshold Pta, a transition from the first learning step to a second learning step is made. In the first embodiment, the operator executes operation of the electrical operation lever device A1 for returning the work device 1A to the learning start posture every time the learning step is completed.

In the second learning step (the number i of learning steps=2), the learning section 145 outputs the learning regulator pressure PPcs to the valve command computing section 147 for the time Δta (for example, five seconds) from a clock time t2, as in the first learning step. Moreover, the learning section 145 outputs the learning operation pressure Pis(2) to the valve command computing section 147 for the time Δta from the clock time t2.

Here, the learning operation pressure Pis(2) is a pressure higher than the learning operation pressure Pis(1) by the rising pressure ΔPis(for example, 0.05 MPa) (Pis(2)=Pis(1)+ΔPis).

The learning section 145 increases the learning operation pressure Pis(i) by the rising pressure ΔPis in each learning step (Pis(i+1)=Pis(i)+ΔPis). Further, when it is determined that the average cylinder pressure Pav(x) is equal to or lower than the pressure threshold Pta in an X-th learning step (the number i of learning steps=x), the learning section 145 stores the learning operation pressure Pis(x) output at this time, as the learning result operation pressure Pisx.

Although the learning procedure in the case of boom raising has been described above, learning procedures in the cases of boom lowering, arm pulling, arm pushing, bucket pulling, and bucket pushing are also similar. That is, similar learning can be executed with regard to the respective operation directions of all flow control valves. The pressure threshold Pta is set for each of the operation directions of the flow control valves D1 to D6.

In this manner, in the present embodiment, the learning section 145 stores, in the learning processing, as the learning result operation pressure Pisx, the learning operation pressure Pis(i) when the pressure of the outlet side of the respective hydraulic cylinders 5 to 7 has become equal to or lower than the pressure threshold Pta as the reference value in the process of raising in a stepwise manner the operation pressure generated by the respective solenoid valves 55*a* to 59*b*. The stored learning result operation pressure Pisx is used for the correction processing.

—Correction Processing—

Figure 13:
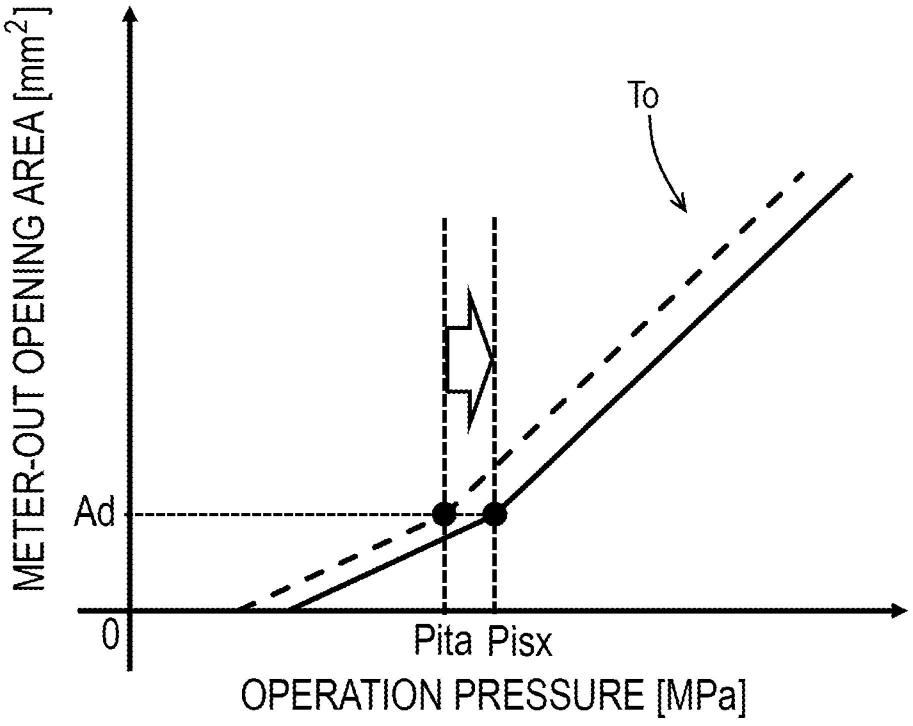

The learning section 145 corrects the opening characteristic table To on the basis of the result of the above-described learning processing. The contents of the correction processing of the opening characteristic table To will be described in detail with reference to FIG. 13. FIG. 13 is a diagram explaining a correction method of the opening characteristic table To. In FIG. 13, reference data (design data) of the opening characteristic table To, that is, the opening characteristic table available before correction, is illustrated by a dashed line. Furthermore, in FIG. 13, the opening characteristic table obtained after correction is illustrated by a solid line.

In the learning section 145, the operation pressure (design value) Pita and the opening area Ad when the cylinder pressure of the meter-out side becomes the pressure threshold Pta are stored. The operation pressure (design value) Pita is set in advance by a desk calculation, an experiment using a prototype machine, or the like. The operation pressure (design value) Pita is set for each of the operation directions of the flow control valves D1 to D6 similarly to the pressure threshold Pta.

The learning section 145 executes offset correction of the opening characteristic table To in such a manner that the position of the operation pressure (design value) Pita corresponding to the opening area Ad corresponds with the position of the learning result operation pressure Pisx. In other words, the learning section 145 offsets the opening characteristic table To by the difference (deviation) between the learning result operation pressure Pisx and the operation pressure (design value) Pita. As a result, for example, the operation pressure associated with the opening area Ad is changed from Pita to Pisx, and the opening characteristic table To is corrected from the characteristic of the dashed line to the characteristic of the solid line.

After the learning processing and the correction processing, when the area limiting control is executed, the target pressure computing section 146 computes the target operation pressure Pi1 on the basis of the opening characteristic table To obtained after the correction (characteristic illustrated by the solid line in FIG. 13) and outputs it to the valve command computing section 147.

It is preferable to execute the above-described learning processing at the time of factory shipment, at the time of replacement of the spool of the respective flow control valves D1 to D6, at the time when the spool stroke has changed to a certain extent from the characteristic at the time of factory shipment due to deterioration of the respective flow control valves D1 to D6 over time, or the like. This allows execution of the MC with high accuracy for a long period of time.

—Effects—

According to the above-described first embodiment, the following operations and effects are provided.

(1) The controller 40 executes the learning processing in which the controller 40 changes in a stepwise manner the operation pressure generated by the respective solenoid valves 55*a* to 59*b* and inputs the pressure of the respective hydraulic cylinders 5 to 7 sensed by the pressure sensor 5*a*, 5*b*, 6*a*, 6*b*, 7*a*, or 7*b*, to store the operation pressure Pis when the input pressure of the respective hydraulic cylinders 5 to 7 (average cylinder pressure Pav) has become the reference value Pta set in advance. The controller 40 calculates the differential pressure ΔP across the respective flow control valves D1 to D6 (in the present embodiment, the differential pressure ΔPo across the meter-out passage part of the respective flow control valves D1 to D6). The controller 40 computes the target opening area A of the respective flow control valves D1 to D6 on the basis of the calculated differential pressure ΔP across the respective flow control valves D1 to D6 and the target flow rate Q of the hydraulic operating fluid that passes through the respective flow control valves D1 to D6. Specifically, the controller 40 computes the target opening area A of the respective flow control valves D1 to D6 (in the present embodiment, the target opening area Aout of the meter-out passage part) by (expression 3) (in the present embodiment, by (expression 4)) on the basis of the calculated differential pressure ΔP across the respective flow control valves D1 to D6 (in the present embodiment, the differential pressure ΔPo across the meter-out passage part), the flow rate coefficient C of the respective flow control valves D1 to D6 (in the present embodiment, the flow rate coefficient Co of the meter-out passage part), and the target flow rate Q of the hydraulic operating fluid that passes through the respective flow control valves D1 to D6 (in the present embodiment, the target flow rate Qout of the hydraulic operating fluid that passes through the meter-out passage part).

The controller 40 computes the target value (target operation pressure) Pi1 of the operation pressure generated by the respective solenoid valves 55*a* to 59*b*, on the basis of the opening characteristic table To available before correction (characteristic illustrated by the dashed line in FIG. 13), the computed target opening area A (in the present embodiment, Aout), and the learning result operation pressure Pisx that is the operation pressure Pis stored in the learning processing. The controller 40 according to the present embodiment corrects the opening characteristic table To (characteristic illustrated by the dashed line in FIG. 13) on the basis of the learning result operation pressure Pisx, and refers to the corrected opening characteristic table To (characteristic illustrated by the solid line in FIG. 13) to compute the target value Pi1 of the operation pressure on the basis of the target opening area A (in the present embodiment, Aout). The controller 40 controls the respective solenoid valves 55*a* to 59*b* on the basis of the target value Pi1 of the computed operation pressure.

According to this configuration, by the learning and the correction, the flow control valves D1 to D6 can be controlled with reduction in the influence of the manufacturing error of the flow control valves D1 to D6 and reproduction of the opening characteristic of the flow control valve used in a prototype machine in advance. As a result, the claw tip (control point) of the bucket 10 can be accurately moved in the area limiting control or the like.

As the hydraulic system, a closed center system may be employed or an open center system may be employed. In the case where the hydraulic cylinders 5 to 7 are to be operated at a predetermined target flow rate, the controller 40 according to the present embodiment computes the target opening area by using the expression of the orifice set up in consideration of the target flow rate and the load pressure of the respective hydraulic cylinders 5 to 7. Thus, even in the case of employing an open center system as the hydraulic system, the hydraulic cylinders 5 to 7 can be operated in accordance with the target flow rate irrespective of light load, high load, and so forth.

As described above, according to the present embodiment, irrespective of the configuration of the hydraulic system, variation in operation of the hydraulic cylinder caused by the individual difference of the work machine is suppressed, and the work machine capable of performing work with high accuracy can be provided.

(2) The controller 40 employs at least the state in which the posture of the work device 1A is the learning start posture as one of the conditions for starting the learning processing. This allows the controller 40 to properly acquire the learning result operation pressure Pisx and accurately correct the opening characteristic table To.

Modification Example of First Embodiment

In the above description, explanation has been made of the example in which the controller 40 employs one flow control valve (for example, flow control valve D3 for the boom) as the learning target in one time of the learning processing. However, a plurality of flow control valves may be employed as the learning target in one time of the learning processing. The hydraulic excavator (work machine) 1 includes the plurality of flow control valves D1 to D6 corresponding to the plurality of hydraulic cylinders 5 to 7 and the plurality of solenoid valves 56*a* to 59*b* that can individually control each of the plurality of flow control valves D3 to D6. Moreover, the configuration is made in such a manner that each of the three main pumps 201, 202, and 203 can individually connect to, on a one-to-one basis, a respective one of three flow control valves (for example, flow control valves D6, D4, and D3) corresponding to each of the boom cylinder 5, the arm cylinder 6, and the bucket cylinder 7.

Thus, in the learning processing, the controller 40 can change synchronously and in a stepwise manner a plurality of operation pressures generated by each of a plurality of solenoid valves (for example, solenoid valves 56*a*, 57*a*, and 59*a*) and input the pressures of the plurality of hydraulic cylinders 5 to 7 sensed by the pressure sensors 5*a*, 5*b*, 6*a*, 6*b*, 7*a*, and 7*b*. In this case, the controller 40 stores the learning operation pressure Pis(i) when each of the pressures of the plurality of hydraulic cylinders 5 to 7 has become a reference value set with regard to a respective one of the plurality of solenoid valves (for example, solenoid valves 56*a*, 57*a*, and 59*a*), as the learning result operation pressure of the respective one of the plurality of solenoid valves (for example, solenoid valves 56*a*, 57*a*, and 59*a*).

For example, the first main pump 201 and the flow control valve D6, the second main pump 202 and the flow control valve D4, and the third main pump 203 and the flow control valve D3 have configurations that can reserve individual hydraulic lines. Therefore, the learning processing can simultaneously be executed. By simultaneously executing the learning processing, the learning processing of many flow control valves can be completed in a short period of time.

Second Embodiment

The hydraulic excavator 1 according to a second embodiment of the present invention will be described with reference to FIG. 2, FIG. 6, and FIG. 14 to FIG. 17. A configuration that is the same as or equivalent to the configuration described in the first embodiment is given the same reference character, and differences will mainly be described. In the first embodiment, the example in which the controller 40 decides the target operation pressure Pi1 by using the opening characteristic table To of the meter-out side has been described. In contrast, in the second embodiment, the controller 40 decides the target operation pressure Pi1 by using an opening characteristic table Ti of the meter-in side.

Furthermore, in the first embodiment, description has been made of the example in which, in the learning processing, the controller 40 stores the learning operation pressure Pis(i) when the pressure of any of the hydraulic cylinders 5 to 7 has become the reference value Pta set in advance, as the learning result operation pressure Pisx. In contrast, in the second embodiment, in the learning processing, the controller 40 stores the learning operation pressure Pis(i) when the time change rate of the pressure of any of the hydraulic cylinders 5 to 7 has become a reference value set in advance, as the learning result operation pressure Pisx.

—Target Pressure Computing Section—

As illustrated in FIG. 2 and FIG. 6, the target pressure computing section 146 according to the second embodiment calculates a differential pressure ΔPi across the meter-in passage part of the respective flow control valves D1 to D6. The target pressure computing section 146 computes a target opening area (hereinafter, a meter-in target opening area) Ain of the meter-in passage part of the respective flow control valves D1 to D6 by the following (expression 8) of the orifice on the basis of the calculated differential pressure ΔPi across the meter-in passage part, a flow rate coefficient Ci of the meter-in passage part of the respective flow control valves D1 to D6, and a target flow rate Qin of the hydraulic operating fluid that passes through the meter-in passage part of the respective flow control valves D1 to D6.

$$Ain = Qin / Ci\sqrt{\Delta Pi} \qquad \text{(expression 8)}$$

That is, (expression 8) of the orifice used in the present second embodiment is one that is obtained by replacing A, Q, C, and ΔP of (expression 3) by Ain, Qin, Ci, and ΔPi, respectively.

Here, the differential pressure ΔPi across the meter-in passage part is obtained by subtracting pressure Pai of the meter-in side of the respective hydraulic cylinders 5 to 7 sensed by the respective pressure sensors 5*a* to 7*b* from delivery pressure (pump pressure) Pp of the main pump 201, 202, or 203 sensed by the pressure sensor 201*b*, 202*b*, or 203*b* (Δi=Pp−Pai).

The target flow rate Qin is obtained by converting the target velocity of the respective hydraulic cylinders 5 to 7 computed by the target velocity computing section 144 to the flow rate of the meter-in side of the respective hydraulic cylinders 5 to 7.

Figure 14:
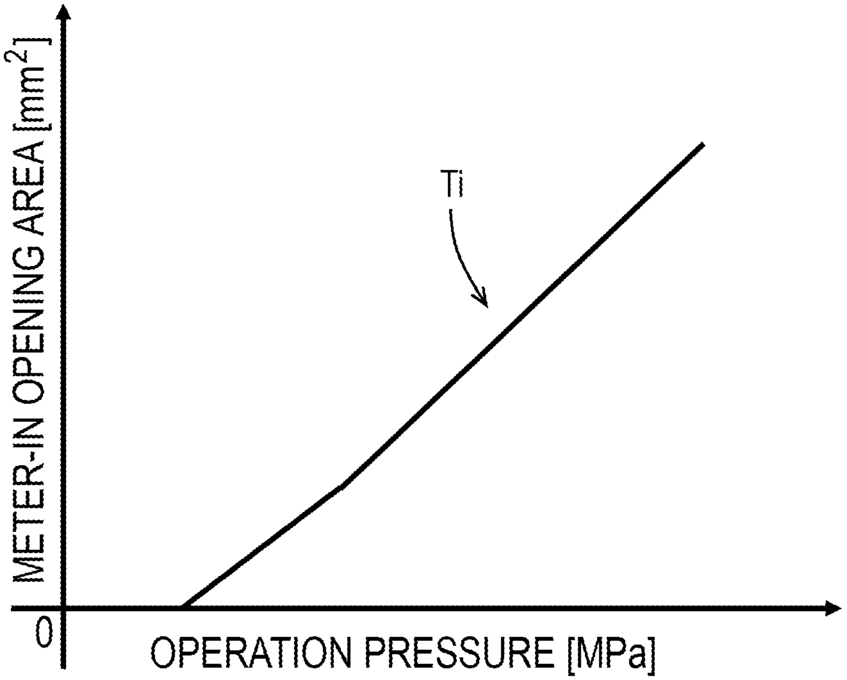
FIG. 14 is an opening line diagram of a meter-in passage part of the flow control valves and illustrates the relation between the operation pressure input to the pressure receiving chambers of the flow control valves and the opening area of the meter-in passage part of the flow control valves.

With reference to FIG. 14, description will be made of one example of an opening characteristic of the meter-in passage part of the flow control valves D1 to D6. FIG. 14 is an opening line diagram of the meter-in passage part of the flow control valves D1 to D6 and illustrates the relation between the operation pressure input to the pressure receiving chambers E1 to E12 of the flow control valves D1 to D6 and the opening area of the meter-in passage part of the flow control valves D1 to D6. As illustrated in FIG. 14, as the operation pressure generated by the respective solenoid valves 55*a* to 59*b* increases, the opening area of the meter-in passage part of the flow control valves D1 to D6 becomes larger. The opening characteristic table Ti that defines the relation between the operation pressure and the opening area of the flow control valves D1 to D6 is stored in the non-volatile memory 42 of the controller 40.

The target pressure computing section 146 refers to the opening characteristic table Ti and computes the target operation pressure Pi1 on the basis of the meter-in target opening area Ain. In the present second embodiment, the opening characteristic table Ti is corrected on the basis of the result of learning processing, as in the first embodiment. That is, the target pressure computing section 146 refers to the corrected opening characteristic table Ti and computes the target operation pressure Pi1 on the basis of the meter-in target opening area Ain.

—Learning Processing—

Figure 15:
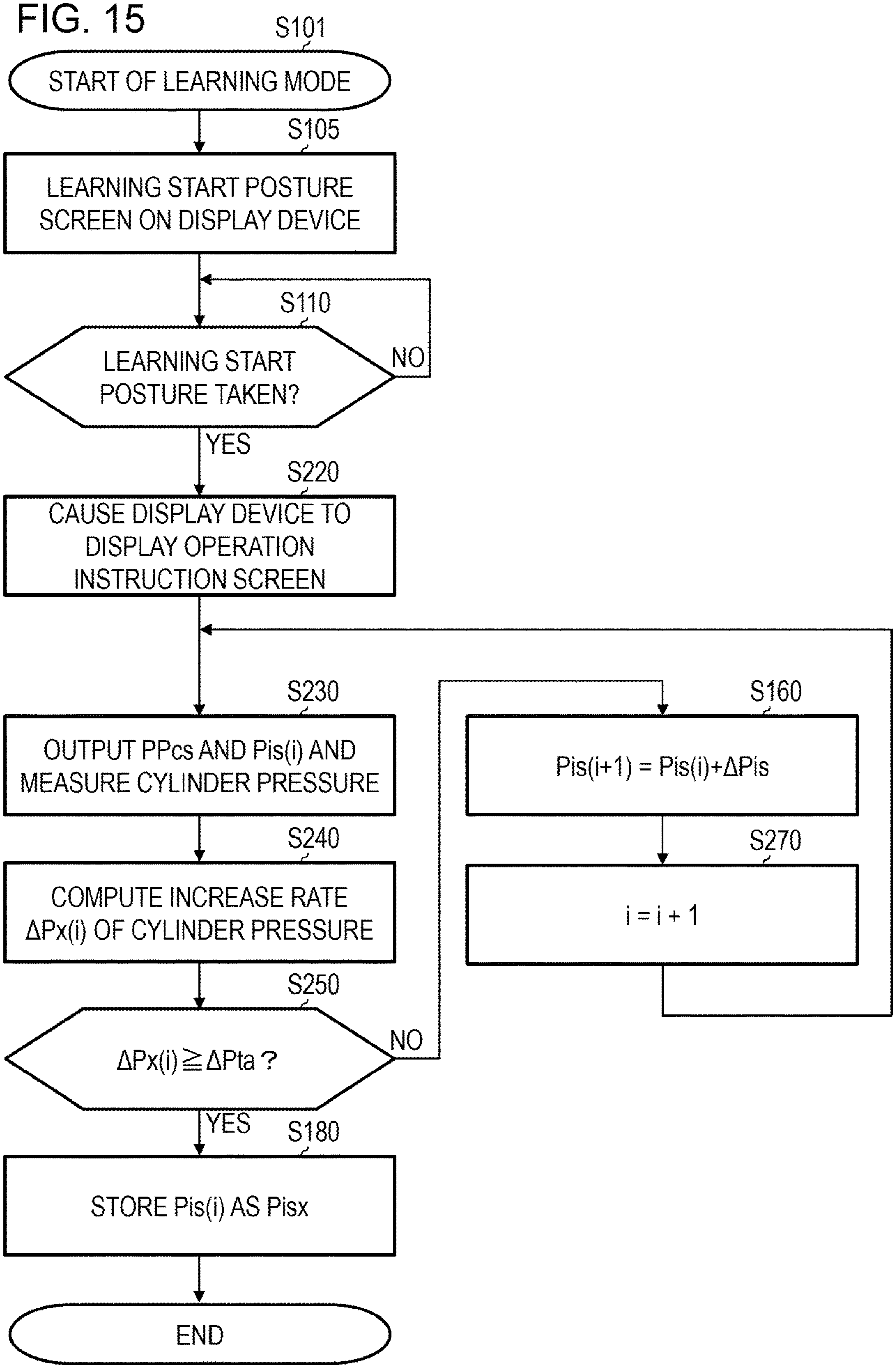
FIG. 15 is a flowchart illustrating one example of the flow of the learning processing executed by the controller according to a second embodiment.

One example of the flow of the learning processing executed by the controller 40 according to the second embodiment will be described with reference to FIG. 15. FIG. 15 is a diagram similar to FIG. 9 and is a flowchart illustrating one example of the flow of the learning processing executed by the controller 40 according to the second embodiment. In the flowchart of FIG. 15, processing of steps S220, S230, S240, S250, and S270 is executed instead of the processing of steps S120, S130, S140, S150, and S170 in the flowchart of FIG. 9.

As in the first embodiment, description will be made by taking as an example a case in which the "flow control valve D3" in the flow control valves D1 to D6 is selected as the flow control valve of the learning target and the "boom raising direction" is selected as the operation direction of the flow control valve.

In step S220, the display control section 148 causes the display device 53 to display the operation instruction screen. An operation instruction that reads, for example, "please operate the boom operation lever to the raising side until the learning ends" is displayed in the operation instruction screen. When the operation instruction screen has been displayed in step S220, the processing proceeds to step S230.

When the electrical operation lever device A1 is operated to the boom raising side by the operator in step S230, the learning processing is started. While the electrical operation lever device A1 is operated, the learning section 145 outputs the learning regulator pressure PPcs and the learning operation pressure Pis(i) to the valve command computing section 147 and measures the cylinder pressure. Here, the cylinder pressure measured in the learning of boom raising is the pressure of the meter-in side of the boom cylinder 5 sensed by the pressure sensor 5*b*. Further, the learning operation pressure Pis is the learning operation pressure PiBM3Us used for control of the solenoid valve 56*a* for boom raising.

The learning regulator pressure PPcs is the learning regulator pressure PPc203*s* used for control of the third regulator 203*a* of the third main pump 203. As a result of the output of the learning regulator pressure PPc203*s* to the valve command computing section 147 by the learning section 145, the hydraulic operating fluid at a flow rate Qc equal to or higher than a certain flow rate is delivered from the third main pump 203.

When the output of the learning regulator pressure and the learning operation pressure and the measurement of the cylinder pressure have been started in step S230, in step S240, the learning section 145 computes an increase rate ΔPx(i) of the cylinder pressure of the meter-in side on the basis of the cylinder pressure measured in step S230, and forwards the processing to step S250. The increase rate ΔPx(i) of the cylinder pressure refers to the amount of increase in the cylinder pressure per unit time, that is, the time change rate of the cylinder pressure.

In step S250, the learning section 145 determines whether or not the increase rate ΔPx(i) of the cylinder pressure computed in step S240 is equal to or higher than an increase rate threshold ΔPta set in advance. The increase rate threshold ΔPta is equivalent to the time change rate of the pressure of the boom cylinder 5 when the hydraulic operating fluid at the flow rate Qc is delivered from the third main pump 203 and the meter-in passage part (opening) of the flow control valve D3 starts to open from the learning start posture for boom raising. The increase rate threshold ΔPta is a reference value (design value) of the time change rate of the cylinder pressure, is set in advance on the basis of a desk calculation, an experiment using a prototype machine, or the like, and is used to sense the start of opening of the flow control valve D3.

When it is determined that the increase rate ΔPx(i) of the cylinder pressure is lower than the increase rate threshold ΔPta in step S250, the learning section 145 determines that the time change rate of the pressure of the boom cylinder 5 has not become the reference value (ΔPta), and forwards the processing to step S160.

In step S160, as in the first embodiment, the learning section 145 computes the learning operation pressure Pis(i+1) to be used in the next learning, by adding the predetermined rising pressure ΔPis to the learning operation pressure Pis(i), and forwards the processing to step S270. In step S270, the learning section 145 executes count-up processing of adding one to the number i of learning steps to employ the addition result as new i, and returns to step S230.

When it is determined that the increase rate ΔPx(i) of the cylinder pressure is equal to or higher than the increase rate threshold ΔPta in step S250, the learning section 145 determines that the time change rate of the pressure of the boom cylinder 5 has become the reference value (ΔPta), and forwards the processing to step S180. In step S180, the learning section 145 stores the learning operation pressure Pis(i) when the time change rate of the pressure of the boom cylinder 5 has become the reference value (ΔPta), as the learning result operation pressure Pisx, and ends the processing illustrated in the flowchart of FIG. 15.

Figure 16:
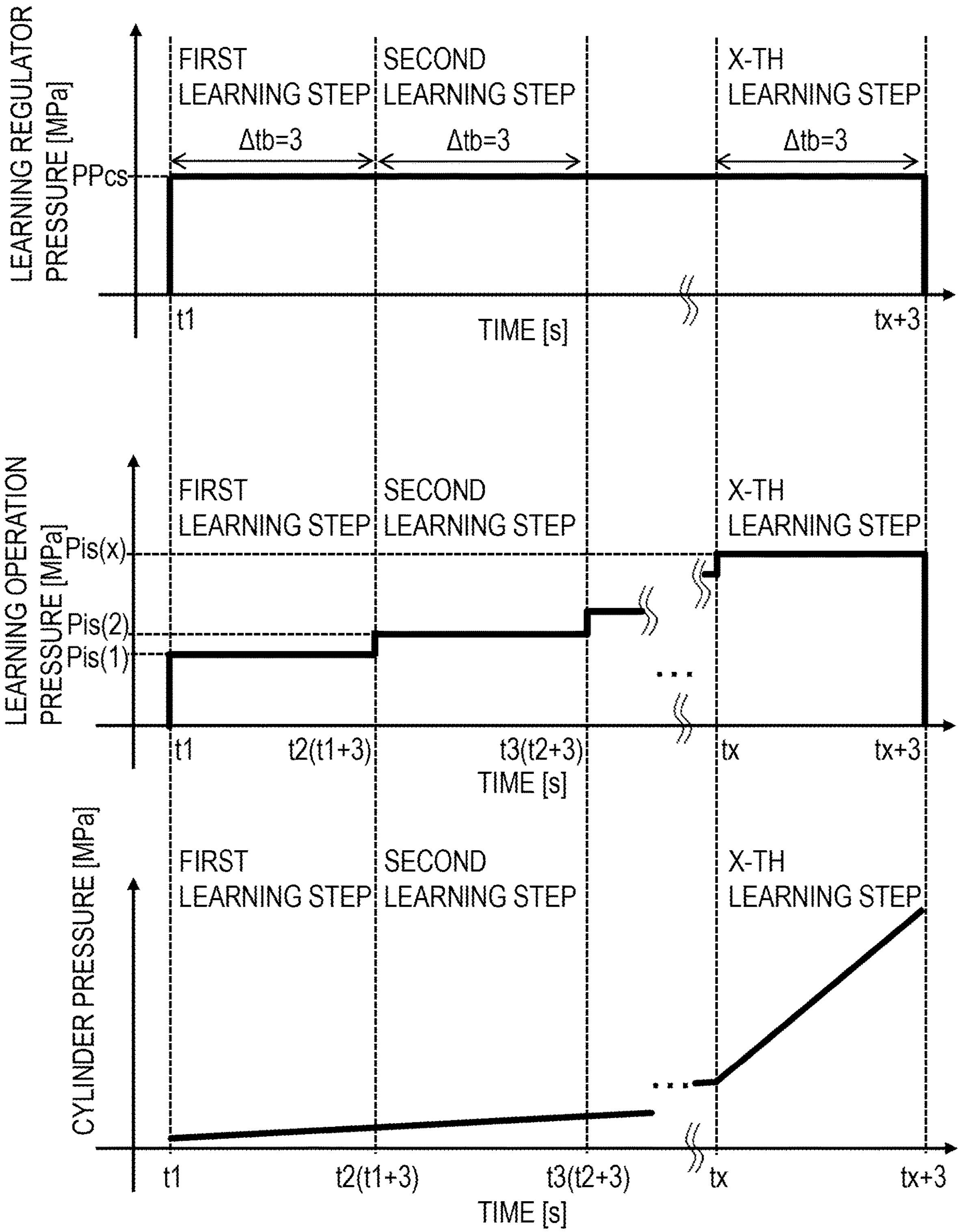
FIG. 16 is a diagram illustrating a time change in the learning regulator pressure and the learning operation pressure output from the learning section according to the second embodiment to the valve command computing section and the cylinder pressure of the meter-in side sensed by the pressure sensor.

FIG. 16 is a diagram illustrating a time change in the learning regulator pressure and the learning operation pressure output from the learning section 145 to the valve command computing section 147 and the cylinder pressure of the meter-in side sensed by the respective pressure sensors 5*a* to 7*b*. As illustrated in FIG. 16, the learning section 145 outputs the learning regulator pressure PPcs to the valve command computing section 147 from the clock time t1.

In a first learning step (the number i of learning steps=1), the learning section 145 outputs the learning operation pressure Pis(1) to the valve command computing section 147 for a predetermined time Δtb (for example, three seconds) set in advance from the clock time t1.

The cylinder pressure starts to rise from the clock time t1 due to a slight leak (leakage) from the flow control valve D3. The learning section 145 computes the increase rate ΔPx(1) of the cylinder pressure from the clock time t1 to the clock time t2.

When the increase rate ΔPx(1) of the cylinder pressure is lower than the increase rate threshold ΔPta, a transition is made from the first learning step to a second learning step. In the second embodiment, the number of learning steps increases in the period during which one time of boom raising operation of the electrical operation lever device A1 is executed by the operator.

In the second learning step (the number i of learning steps=2), the learning section 145 outputs the learning operation pressure Pis(2) to the valve command computing section 147 for the predetermined time Δtb (for example, three seconds) from the clock time t2, as in the first learning step.

Here, the learning operation pressure Pis(2) is a pressure higher than the learning operation pressure Pis(1) by the rising pressure ΔPis(for example, 0.05 MPa) (Pis(2)=Pis(1)+ΔPis).

The learning section 145 increases the learning operation pressure Pis(i) by the rising pressure ΔPis in each learning step (Pis(i+1)=Pis(i)+ΔPis). Further, when it is determined that the increase rate ΔPx(x) of the cylinder pressure is equal to or higher than the increase rate threshold ΔPta in an X-th learning step (the number i of learning steps=x), the learning section 145 stores the learning operation pressure Pis(x) output at this time, as the learning result operation pressure Pisx.

Although the learning procedure in the case of boom raising has been described above, learning procedures in the cases of boom lowering, arm pulling, arm pushing, bucket pulling, and bucket pushing are also similar. That is, similar learning can be executed with regard to the respective operation directions of all flow control valves. The increase rate threshold ΔPta is set for each of the operation directions of the flow control valves D1 to D6.

In this manner, in the present embodiment, in the learning processing, the learning section 145 stores, as the learning result operation pressure Pisx, the learning operation pressure Pis(i) when the increase rate of the pressure of the inlet side of the respective hydraulic cylinders 5 to 7 has become equal to or higher than the increase rate threshold ΔPta as the reference value in the process of raising in a stepwise manner the operation pressure generated by the respective solenoid valves 55*a* to 59*b*. The stored learning result operation pressure Pisx is used for the correction processing.

—Correction Processing—

Figure 17:
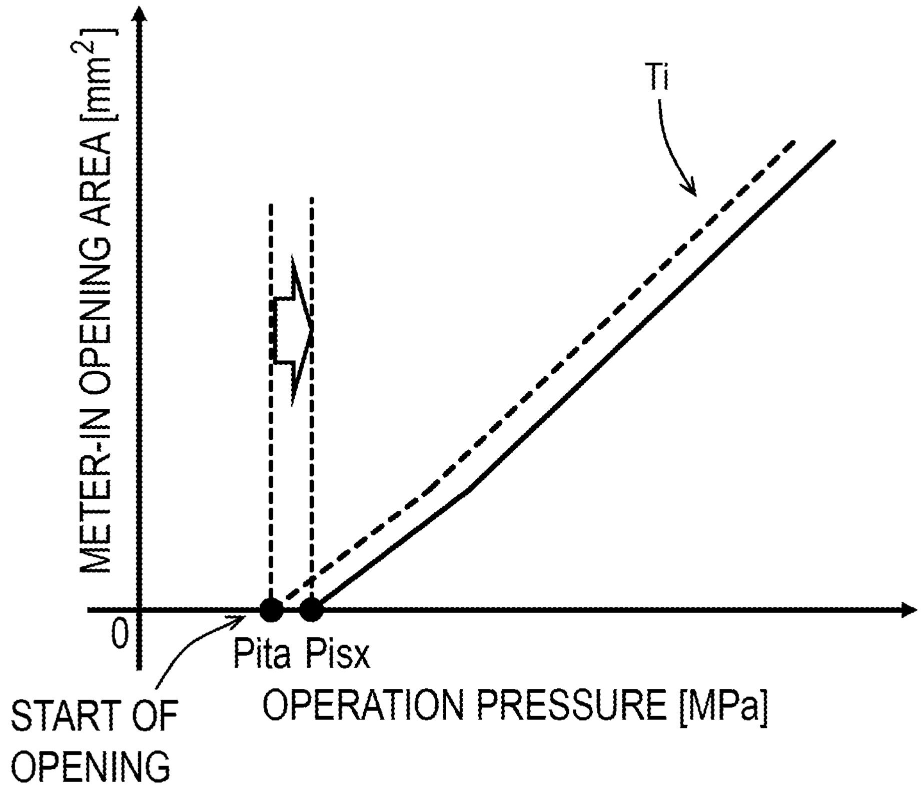
FIG. 17 is a diagram explaining a correction method of an opening characteristic table Ti.

The learning section 145 corrects the opening characteristic table Ti on the basis of the result of the above-described learning processing. The contents of the correction processing of the opening characteristic table Ti will be described in detail with reference to FIG. 17. FIG. 17 is a diagram explaining a correction method of the opening characteristic table Ti. In FIG. 17, reference data (design data) of the opening characteristic table Ti, that is, the opening characteristic table available before correction, is illustrated by a dashed line. Further, in FIG. 17, the opening characteristic table obtained after correction is illustrated by a solid line.

In the learning section 145, the operation pressure (design value) Pita when the increase rate of the cylinder pressure of the meter-in side becomes the increase rate threshold ΔPta is stored. The operation pressure (design value) Pita is set in advance by a desk calculation, an experiment using a prototype machine, or the like. The operation pressure (design value) Pita is set for each of the operation directions of the flow control valves D1 to D6 similarly to the increase rate threshold ΔPta.

The learning section 145 executes offset correction of the opening characteristic table Ti in such a manner that the position of the operation pressure (design value) Pita at the start of opening of the respective flow control valves D1 to D6 corresponds with the position of the learning result operation pressure Pisx. In other words, the learning section 145 offsets the opening characteristic table Ti by the difference (deviation) between the learning result operation pressure Pisx and the operation pressure (design value) Pita. As a result, the operation pressure at the start of opening of the corresponding one of the flow control valves D1 to D6 is changed from Pita to Pisx, and the opening characteristic table Ti is corrected from the characteristic of the dashed line to the characteristic of the solid line.

After the learning processing and the correction processing, when the area limiting control is executed, the target pressure computing section 146 computes the target operation pressure Pi1 on the basis of the opening characteristic table Ti obtained after the correction (characteristic illustrated by the solid line in FIG. 17). As described above, in the present second embodiment, the controller 40 computes the target value (target operation pressure) Pi1 of the operation pressure generated by the respective solenoid valves 55*a* to 59*b*, on the basis of the opening characteristic table Ti available before correction, the computed target opening area Ain, and the learning result operation pressure Pisx. The controller 40 controls the respective solenoid valves 55*a* to 59*b* on the basis of the target value Pi1 of the operation pressure.

—Effects—

According to such a second embodiment, operations and effects similar to those of the first embodiment are provided.

The following modification examples are also within the scope of the present invention, and it is also possible to combine a configuration illustrated in the modification example and a configuration explained in the above-described embodiment, combine configurations explained in the above-described different embodiments with each other, and combine configurations to be explained in the following different modification examples with each other.

Modification Example 1

Figure 18:
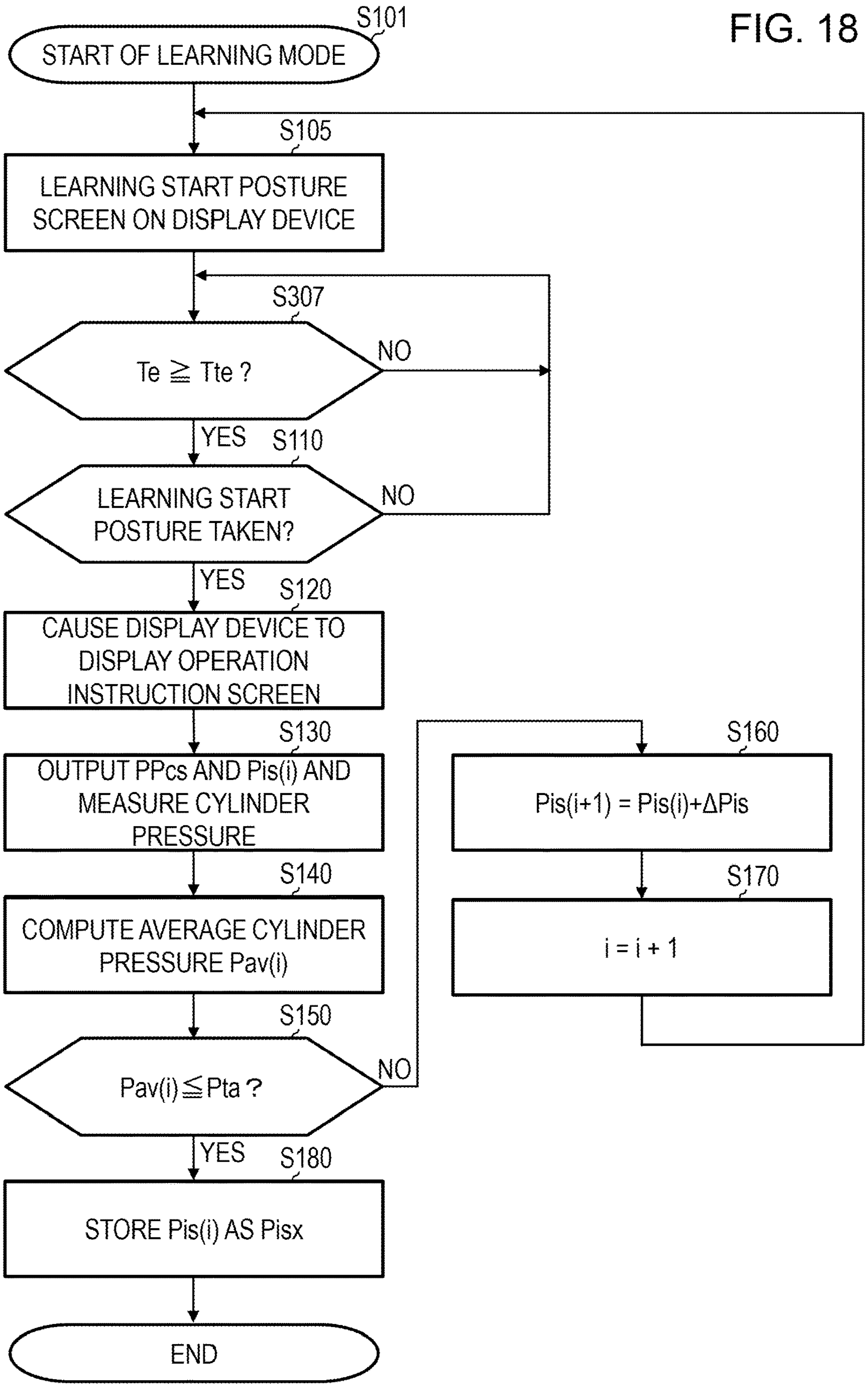
FIG. 18 is a flowchart illustrating one example of the flow of the learning processing executed by the controller according to modification example 1.

Modification example 1 of the embodiment of the present invention will be described with reference to FIG. 18. FIG. 18 is a diagram similar to FIG. 9 and is a flowchart illustrating one example of the flow of the learning processing executed by the controller 40 according to modification example 1. The pressure of the meter-in side and the pressure of the meter-out side in the hydraulic cylinders 5 to 7 change depending on the temperature of the hydraulic operating fluid. Thus, the controller 40 according to the present modification example executes the learning processing only when the temperature of the hydraulic operating fluid is equal to or higher than a temperature threshold set in advance.

In the flowchart of FIG. 18, processing of a step S307 is added after step S105 in the flowchart of FIG. 9. As illustrated in FIG. 18, in step S307, the learning section 145 determines whether or not a temperature Te of the hydraulic operating fluid sensed by the temperature sensor 19 is equal to or higher than a temperature threshold Tte. The temperature threshold Tte is stored in the non-volatile memory 42 in advance.

When it is determined that the temperature Te of the hydraulic operating fluid is equal to or higher than the temperature threshold Tte in step S307, the processing proceeds to step S110. The determination processing of step S307 is repeatedly executed at a predetermined control cycle until the affirmative determination is made. In step S110, the learning section 145 determines whether or not the posture of the work device 1A is the learning start posture, as in the first embodiment. When it is determined that the posture of the work device 1A is not the learning start posture in step S110, the processing returns to step S307.

In this manner, in the present modification example, the posture of the work device 1A being the learning start posture and the temperature Te of the hydraulic operating fluid being equal to or higher than the temperature threshold Tte are employed as the conditions for starting the learning processing. Employing at least the temperature Te of the hydraulic operating fluid being equal to or higher than the temperature threshold Tte as one of the conditions for starting the learning processing (S130 to S180) as above prevents the learning processing from being executed when the temperature Te of the hydraulic operating fluid is lower than the temperature threshold Tte. This can lead to improvement in the work accuracy in the area limiting control. Although the example in which the determination processing (S307) of the hydraulic operating fluid temperature is added in the first embodiment has been described, the determination processing (S307) of the hydraulic operating fluid temperature may be added in the second embodiment.

Modification Example 2

In the three-pump system explained in the above-described embodiments, the three main pumps 201, 202, and 203 can be individually connected to three flow control valves corresponding to the three hydraulic cylinders, on a one-to-one basis. Thus, for example, in the second embodiment, in the case of starting learning with a posture with cylinder ends so as to keep the posture constant, it becomes possible to simultaneously execute learning with regard to a plurality of flow control valves because the influence of flow dividing and the load is less likely to appear mutually. For example, the first main pump 201 and the flow control valve D6, the second main pump 202 and the flow control valve D4, and the third main pump 203 and the flow control valve D3 have configurations that can reserve individual hydraulic lines. Therefore, they can be employed as the learning target in one time of the learning processing.

In the learning processing, the controller 40 stores the operation pressure Pis(i) when each of the time change rates of the pressures of the plurality of hydraulic cylinders 5 to 7 has become a reference value set with regard to a respective one of a plurality of solenoid valves (for example, solenoid valves 56*a*, 57*a*, and 59*a*) as the learning result operation pressure of the respective one of the plurality of solenoid valves (for example, solenoid valves 56*a*, 57*a*, and 59*a*). By simultaneously executing the learning processing of the plurality of flow control valves, the learning processing of many flow control valves can be completed in a short period of time.

Moreover, the hydraulic system is not limited to the case of employing the three-pump system. For example, similar learning is possible also in a two-pump system as the one illustrated in FIG. 19. However, in the case of the two-pump system, when three-combined operation of the boom 8, the arm 9, and the bucket 10 is executed, flow dividing into the flow control valve D1 and the flow control valve D6 occurs in the hydraulic operating fluid delivered from the first main pump 201 and therefore simultaneous learning is impossible.

Modification Example 3

Figure 19:
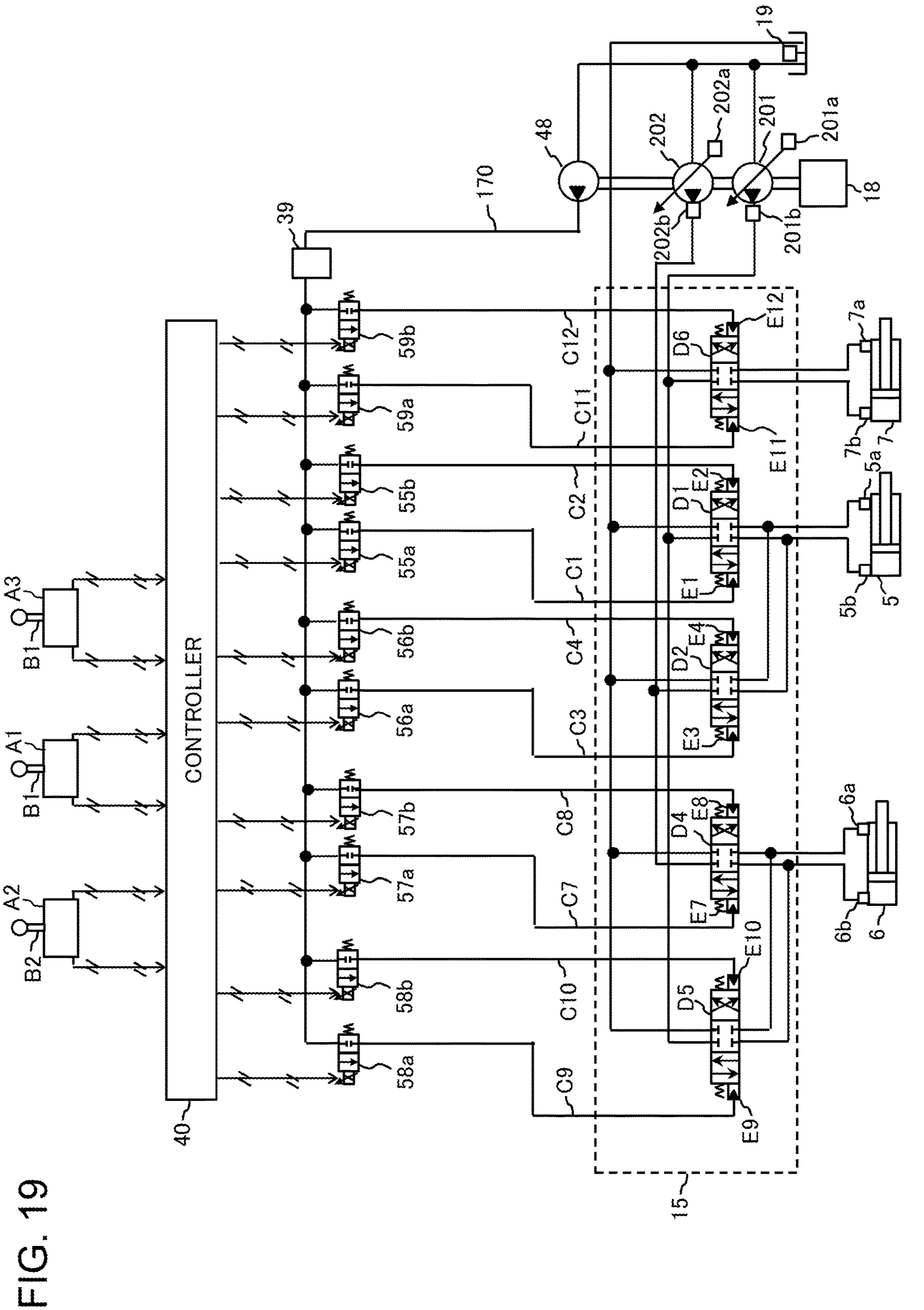
FIG. 19 is a diagram illustrating the configuration of a hydraulic system according to modification example 2.
Figure 20:
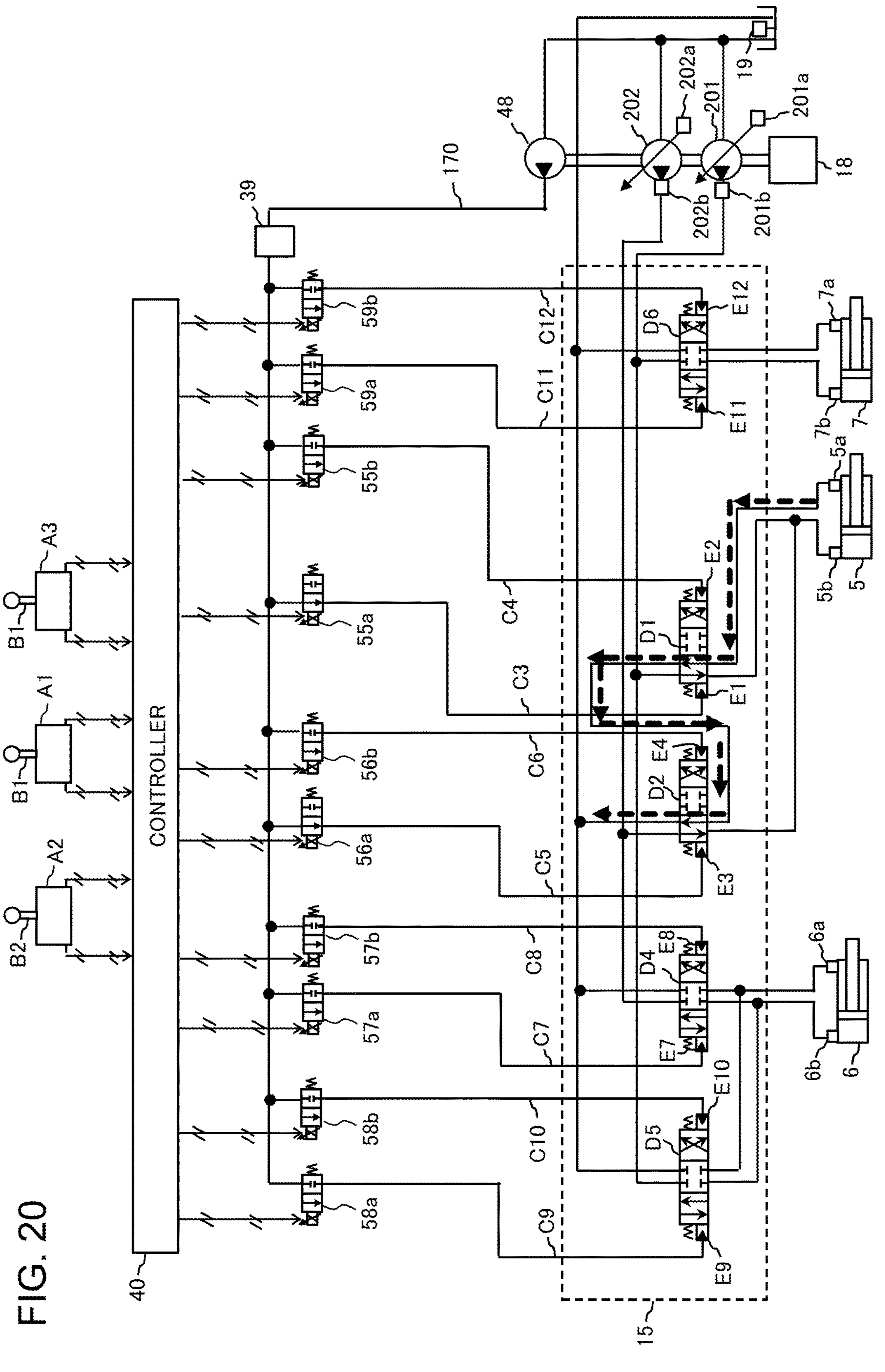
FIG. 20 is a diagram illustrating the configuration of a hydraulic system according to modification example 3.

The configuration of the hydraulic system is not limited to the examples illustrated in FIG. 2 and FIG. 19. The present invention may be applied to the hydraulic excavator 1 including a hydraulic system in which the hydraulic operating fluid discharged from any of the hydraulic cylinders 5 to 7 passes through a plurality of flow control valves to return to the tank. For example, a hydraulic system illustrated in FIG. 20 includes the first flow control valve D1 and the second flow control valve D2 as flow control valves that control the flow rate of the hydraulic operating fluid supplied to the boom cylinder 5. The first flow control valve D1 and the second flow control valve D2 are configured to cause the hydraulic operating fluid discharged from the rod chamber of the boom cylinder 5 to pass through the first flow control valve D1 and the second flow control valve D2. That is, in this hydraulic system, at the time of boom raising operation, a meter-out flow line on which the hydraulic operating fluid discharged from the rod chamber of the boom cylinder 5 flows to the tank through the first flow control valve D1 and the second flow control valve D2 is formed.

In this configuration, in the case of employing the second flow control valve D2 as the learning target, in the learning processing, the controller 40 raises in a stepwise manner the operation pressure generated by the solenoid valve 56*a* corresponding to the second flow control valve D2 in the state in which the first flow control valve D1 is opened. For example, the controller 40 outputs a certain command (electrical signal) for keeping the meter-out passage part of the first flow control valve D1 at the maximum opening area. In this state, the controller 40 executes the learning processing in which the operation pressure generated by the solenoid valve 56*a* is raised in a stepwise manner. The controller 40 stores, as the learning result operation pressure Pisx, the learning operation pressure Pis(i) when the pressure of the outlet side of the boom cylinder 5 sensed by the pressure sensor 5*a* has become equal to or lower than the pressure threshold Pta as the reference value in the process of raising in a stepwise manner the operation pressure generated by the solenoid valve 56*a*. This allows learning of the opening characteristic of the meter-out passage part of the flow control valve D2 and correction of the opening characteristic table To.

Modification Example 4

In the above-described embodiments, the examples in which the opening characteristic table To or Ti is corrected have been described. However, the present invention is not limited thereto. The controller 40 may refer to the opening characteristic table (reference data) T and compute the target operation pressure that is the target value of the operation pressure on the basis of the target opening area A, to correct the computed target operation pressure on the basis of the learning result operation pressure.

Figure 21:
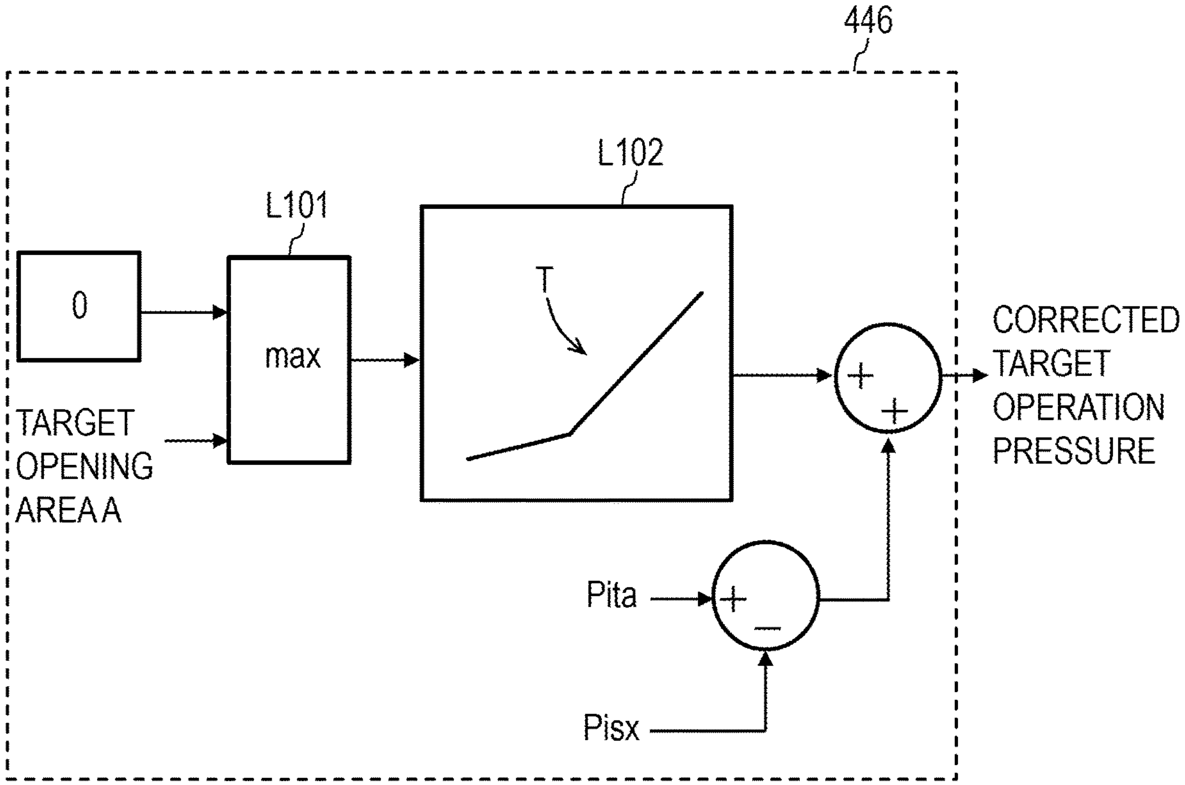
FIG. 21 is a control block line diagram of a target pressure computing section according to modification example 4 and illustrates a correction method of a target operation pressure.

FIG. 21 is a control block line diagram of a target pressure computing section 446 and illustrates a correction method of the target operation pressure. As illustrated in FIG. 21, the target pressure computing section 446 selects the maximum value of the target opening area A and 0 [$mm^2$] to avoid a negative value to be taken with respect to the target opening area A of the meter-in passage part or the meter-out passage part of the flow control valve (L101). The target pressure computing section 446 refers to the opening characteristic table T (reference data) stored in the non-volatile memory 42 and computes the target operation pressure on the basis of the target opening area A (L102). The target pressure computing section 446 outputs, as the target operation pressure after correction, a value obtained by adding the difference between the operation pressure (design value) Pita and the learning result operation pressure Pisx (Pita-Pisx) to the computed target operation pressure. The valve command computing section 147 controls the respective solenoid valves 55*a* to 59*b* on the basis of the corrected target operation pressure. According to this configuration, effects similar to those of the above-described embodiments can be obtained.

Modification Example 5

In the above-described embodiments, description has been made of the examples in which the learning regulator pressure PPcs and the learning operation pressure Pis(i) output in the learning processing have a step waveform (see FIG. 12 and FIG. 16). However, the present invention is not limited thereto. The learning regulator pressure PPcs and the learning operation pressure Pis(i) may gradually be changed at the time of the rising and the falling thereof. This can alleviate shock to the hydraulic excavator 1 in the learning.

Modification Example 6

In both the first embodiment and the second embodiment, the accuracy of the learning becomes higher when variation with respect to the target flow rate (design value) Qc of the delivery flow rate of the main pump 201, 202, or 203 corresponding to the learning regulator pressure is smaller. Thus, it is preferable to execute calibration (learning and correction) of the target operation pressure with respect to the target opening area of the respective flow control valves D1 to D6 after executing calibration of the regulator pressure with respect to the delivery flow rate of the main pump 201, 202, or 203. If the delivery flow rate of the main pump 201, 202, or 203 varies with respect to the target flow rate (design value) Qc, the measured cylinder pressure also varies, and it becomes uncertain whether the opening area corresponding to the aimed pressure (pressure threshold) Pta has been obtained. Thus, it is desirable to execute the learning processing for the respective flow control valves D1 to D6 after making the state in which the hydraulic operating fluid is delivered with the delivery flow rate of the main pump 201, 202, or 203 being almost the same as the design value.

Modification Example 7

The controller 40 may be configured to be capable of executing both the learning processing described in the first embodiment and the learning processing described in the second embodiment. According to this, the target operation pressure Pi1 may be computed by using the opening characteristic table Ti obtained after correction in the second embodiment in a region of the start of motion of the hydraulic cylinders 5 to 7, whereas the target operation pressure Pi1 may be computed by using the opening characteristic table To obtained after correction in the first embodiment in a region in which the flow control valve is opened to a certain degree. This can improve the accuracy of operation of the work device 1A when the hydraulic cylinders 5 to 7 start to move and in a velocity region of a high use frequency in the area limiting control.

Modification Example 8

In the above-described embodiments, the examples in which the learning operation pressure Pis(i) is raised in a stepwise manner in the learning processing have been described. However, the present invention is not limited thereto. In the first embodiment, the controller 40 may lower the learning operation pressure Pis(i) in a stepwise manner. In this case, the controller 40 is only required to store, as the learning result operation pressure Pisx, the learning operation pressure Pis(i) when the pressure of the outlet side of the hydraulic cylinder has become equal to or higher than the pressure threshold Pta as a reference value in the process of lowering the learning operation pressure Pis(i) in a stepwise manner.

Furthermore, in the second embodiment, the controller 40 may lower the learning operation pressure Pis(i) in a stepwise manner. In this case, the controller 40 is only required to store, as the learning result operation pressure Pisx, the learning operation pressure Pis(i) when the time change rate (<0) of the pressure of the inlet side of the hydraulic cylinder has become equal to or lower than a time change rate threshold as a reference value in the process of lowering the learning operation pressure Pis(i) in a stepwise manner. The time change rate threshold used here is equivalent to the time change rate of the pressure of the hydraulic cylinder when the flow control valve starts to close. The time change rate threshold is the reference value (design value) of the time change rate of the cylinder pressure, is set in advance on the basis of a desk calculation, an experiment using a prototype machine, or the like, and is used to sense the start of closing of the flow control valve.

Although the embodiments of the present invention have been described above, the above-described embodiments have merely illustrated part of application examples of the present invention and do not intend to limit the technical scope of the present invention to the specific configurations of the above-described embodiments.

DESCRIPTION OF REFERENCE CHARACTERS

1: Hydraulic excavator (work machine)
1A: Work device
1B: Machine body
5: Boom cylinder (hydraulic cylinder)
5*a*, 5*b*: Pressure sensor
6: Arm cylinder (hydraulic cylinder)
6*a*, 6*b*: Pressure sensor
7: Bucket cylinder (hydraulic cylinder)
7*a*, 7*b*: Pressure sensor
8: Boom (driving target member)
9: Arm (driving target member)
10: Bucket (driving target member)
11: Track structure
12: Swing structure
14: Machine body position sensor
14*a*, 14*b*: GNSS antenna
15: Control valve unit
18: Engine
19: Temperature sensor
21: Control system
30: Boom angle sensor (angle sensor, posture sensor)
31: Arm angle sensor (angle sensor, posture sensor)
32: Bucket angle sensor (angle sensor, posture sensor)
33: Machine body inclination angle sensor (angle sensor, posture sensor)
40: Controller
41: Processing device
42: Non-volatile memory
43: Volatile memory
48: Pilot pump
50: Posture sensor
51: Target surface setting device
53: Display device
53*a*: Learning start posture screen
55*a*, 55*b*, 56*a*, 56*b*, 57*a*, 57*b*, 58*a*, 58*b*, 59*a*, 59*b*: Solenoid valve
96: External input device
141: Operation amount computing section
142: Posture computing section
143: Target surface computing section
144: Target velocity computing section
145: Learning section
146: Target pressure computing section
147: Valve command computing section
148: Display control section
149: Solenoid valve control section
170: Delivery line
201: First main pump (hydraulic pump)
201*a*: First regulator
201*b*: Pressure sensor
202: Second main pump (hydraulic pump)
202*a*: Second regulator
202*a*: Regulator
202*b*: Pressure sensor
203: Third main pump (hydraulic pump)
203*a*: Third regulator
203*b*: Pressure sensor
446: Target pressure computing section
A: Target opening area
A1, A2, A3: Electrical operation lever device (operation device)
Ain: Meter-in target opening area (target opening area)
Aout: Meter-out target opening area (target opening area)
D1: Flow control valve (first flow control valve)
D2: Flow control valve (second flow control valve)
D3 to D6: Flow control valve
Pai: Pressure of the meter-in side of the hydraulic cylinder (cylinder pressure)
Pao: Pressure of the meter-out side of the hydraulic cylinder (cylinder pressure)
Pav: Average cylinder pressure (average of the cylinder pressure)
Pb: Tip position of the bucket (position of a control point of the work device)
Pi0: Operation amount operation pressure (target value of the operation pressure corresponding to the operation amount)
Pi1: Target operation pressure (target value of the operation pressure corresponding to a target velocity)
Pis: Learning operation pressure (target value of the operation pressure computed in learning processing)
Pisx: Learning result operation pressure
Pita: Operation pressure (design value)
Pp: Delivery pressure (pump pressure)
PPc201, PPc202, PPc203: Target regulator pressure
PPcs: Learning regulator pressure
Pt: Tank pressure
Pta: Pressure threshold (reference value)
Q, Qin, Qout: Target flow rate
St: Excavation target surface
T, Ti, To: Opening characteristic table
Tte: Temperature threshold
ΔP, ΔPi, ΔPo: Differential pressure across the flow control valve
ΔPta: Increase rate threshold (reference value)
ΔPx: Increase rate

The invention claimed is:

1. A work machine comprising;
a hydraulic pump that delivers a hydraulic operating fluid;
a hydraulic cylinder driven by the hydraulic operating fluid delivered from the hydraulic pump;
a driving target member driven by the hydraulic cylinder;
a flow control valve that controls a flow rate of the hydraulic operating fluid supplied from the hydraulic pump to the hydraulic cylinder;
a solenoid valve that generates an operation pressure for operating the flow control valve;
a controller that controls the solenoid valve; and
a pressure sensor that senses a pressure of the hydraulic cylinder, wherein an opening characteristic table that defines a relation between the operation pressure and an opening area of the flow control valve is stored in the controller, and the controller is configured to execute learning processing of changing in a stepwise manner the operation pressure generated by the solenoid valve and storing the operation pressure when the pressure of the hydraulic cylinder sensed by the pressure sensor or a time change rate of the pressure of the hydraulic cylinder has become a reference value set in advance, calculate a differential pressure across the flow control valve, compute a target opening area of the flow control valve on the basis of the differential pressure across the flow control valve calculated and a target flow rate of the hydraulic operating fluid that passes through the flow control valve, compute a target value of the operation pressure generated by the solenoid valve, on the basis of the opening characteristic table, the target opening area computed, and a learning result operation pressure that is the operation pressure stored in the learning processing, and control the solenoid valve on the basis of the target value of the operation pressure computed.

2. The work machine according to claim 1, wherein the controller is configured to correct the opening characteristic table on the basis of the learning result operation pressure, and refer to the opening characteristic table corrected and compute the target value of the operation pressure on the basis of the target opening area.

3. The work machine according to claim 1, wherein the controller is configured to refer to the opening characteristic table and compute the target value of the operation pressure on the basis of the target opening area, correct the target value of the operation pressure on the basis of the learning result operation pressure, and control the solenoid valve on the basis of the target value of the operation pressure corrected.

4. The work machine according to claim 1, wherein the controller is configured to store, as the learning result operation pressure, the operation pressure when a pressure of an outlet side of the hydraulic cylinder has become equal to or lower than a pressure threshold as the reference value in a process of raising in the stepwise manner the operation pressure generated by the solenoid valve, in the learning processing, calculate a differential pressure across a meter-out passage part of the flow control valve, compute a target opening area of the meter-out passage part of the flow control valve on the basis of the differential pressure across the meter-out passage part calculated and a target flow rate of the hydraulic operating fluid that passes through the meter-out passage part, and compute the target value of the operation pressure generated by the solenoid valve, on the basis of the opening characteristic table, the target opening area of the meter-out passage part computed, and the learning result operation pressure.

5. The work machine according to claim 4, wherein the work machine includes a first flow control valve and a second flow control valve as the flow control valve, the first flow control valve and the second flow control valve are configured to cause the hydraulic operating fluid discharged from the hydraulic cylinder to pass through the first flow control valve and the second flow control valve, and the controller is configured to raise in a stepwise manner the operation pressure generated by the solenoid valve corresponding to the second flow control valve, in a state in which the first flow control valve is opened in the learning processing, and store, as the learning result operation pressure, the operation pressure when the pressure of the outlet side of the hydraulic cylinder has become equal to or lower than the pressure threshold in the process of raising in the stepwise manner the operation pressure generated by the solenoid valve.

6. The work machine according to claim 1, wherein the controller is configured to store, as the learning result operation pressure, the operation pressure when an increase rate of pressure of an inlet side of the hydraulic cylinder has become equal to or higher than an increase rate threshold as the reference value in a process of raising in the stepwise manner the operation pressure generated by the solenoid valve, in the learning processing, calculate a differential pressure across a meter-in passage part of the flow control valve, compute a target opening area of the meter-in passage part of the flow control valve on the basis of the differential pressure across the meter-in passage part calculated and a target flow rate of the hydraulic operating fluid that passes through the meter-in passage part, and compute the target value of the operation pressure generated by the solenoid valve, on the basis of the opening characteristic table, the target opening area of the meter-in passage part computed, and the learning result operation pressure.

7. The work machine according to claim 1, wherein the hydraulic pump comprises a plurality of the hydraulic pumps;

the hydraulic cylinder comprises a plurality of the hydraulic cylinders;

the flow control valve comprises a plurality of the flow control valves corresponding to each of the plurality of the hydraulic cylinders;

the solenoid valve comprises a plurality of the solenoid valves and the operation pressure is a plurality of operation pressures respectively generated by each of the plurality of solenoid valves for operating a respective one of the flow control valves; and the pressure sensor comprises a plurality of pressure sensors that sense input pressures of each of the plurality of hydraulic cylinders, wherein each of the plurality of the hydraulic pumps is allowed to individually connect to, on a one-to-one basis, a respective one of the plurality of the flow control valves corresponding to each of the plurality of the hydraulic cylinders, and the controller is configured to change synchronously and in a stepwise manner a plurality of the operation pressures generated by each of the plurality of the solenoid valves, and store the operation pressures when each of the input pressures of the plurality of the hydraulic cylinders or time change rates of the input pressures of the plurality of the hydraulic cylinders has become the reference value set with regard to a respective one of the plurality of the solenoid valves, as the learning result operation pressure of the respective one of the plurality of the solenoid valves.

8. The work machine according to claim 1, comprising:

a posture sensor that senses a posture of a work device to which a plurality of the driving target members are joined, wherein the controller is configured to determine whether or not the posture of the work device sensed by the posture sensor is a learning start posture defined in advance, and employ at least a state in which the posture of the work device is the learning start posture as a condition for starting the learning processing.

9. The work machine according to claim 1, comprising:

a temperature sensor that senses temperature of the hydraulic operating fluid, wherein the controller is configured to determine whether or not the temperature of the hydraulic operating fluid sensed by the temperature sensor is equal to or higher than a temperature threshold set in advance, and employ at least a state in which the temperature of the hydraulic operating fluid is equal to or higher than the temperature threshold as a condition for starting the learning processing.

* * * * *